US008406783B2

(12) United States Patent
Eitan et al.

(10) Patent No.: US 8,406,783 B2
(45) Date of Patent: Mar. 26, 2013

(54) GEOGRAPHICAL BOUNDARY BASED TRACKING

(75) Inventors: Alecsander P. Eitan, Haifa (IL); Arik S. Mimran, Haifa (IL); Russell G. Sanders, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 12/485,779

(22) Filed: Jun. 16, 2009

(65) Prior Publication Data

US 2010/0090852 A1 Apr. 15, 2010

Related U.S. Application Data

(60) Provisional application No. 61/104,323, filed on Oct. 10, 2008, provisional application No. 61/104,327, filed on Oct. 10, 2008.

(51) Int. Cl.
*H04W 24/00* (2009.01)
(52) U.S. Cl. .............. 455/456.1; 342/450; 340/539.13; 701/300
(58) Field of Classification Search ............. 455/456.1, 455/574; 342/450; 340/559.13; 700/300
See application file for complete search history.

(56) References Cited

U.S. PATENT DOCUMENTS

| 2003/0013449 A1 | 1/2003 | Hose et al. |
| 2007/0139207 A1 | 6/2007 | Agapi et al. |
| 2007/0176771 A1* | 8/2007 | Doyle ................ 340/539.13 |
| 2008/0183485 A1 | 7/2008 | Drabble et al. |
| 2008/0186165 A1* | 8/2008 | Bertagna et al. ........ 340/539.13 |
| 2009/0075677 A1* | 3/2009 | Seger et al. ............... 455/456.6 |

OTHER PUBLICATIONS

International Search Report and Written Opinion—PCT/US2009/060142, International Search Authority—European Patent Office—Mar. 17, 2010.

* cited by examiner

*Primary Examiner* — Zhiyu Lu
*Assistant Examiner* — David Bilodeau
(74) *Attorney, Agent, or Firm* — Shyam K. Parekh; Mary A. Fales

(57) ABSTRACT

An apparatus, method and system for geographical tracking entry and/or exiting of an asset into and/or out of a defined geographical boundary and reporting the same. Entry and exit tests compare position fixes with various thresholds and parameters to determine if the asset has entered or exited the geographical boundary. Tests are sequenced such that tests having lower levels of complexity (lower order) are performed before tests having higher levels of complexity (higher order). In this way, most position fixes are processed using computations having a lower order of mathematical complexity than conventionally implemented.

14 Claims, 20 Drawing Sheets $\Phi_0 = \text{atan}(gy/gx)$ $\Phi_i = \Phi_0 + i * \Phi_\Delta$ $P_i$ = point i on ellipse at angle $\Phi_i$ $d_i$ = length between $P_i$ & G For R + b < d < R + a, iteratively test:

1) If $d_i$ < R, then overlap & done (not OUTSIDE)

2) If $d_i$ > $d_{i-1}$, then $d_{i-1}$ was minimum so no overlap & done (definitely OUTSIDE; report EXIT event)

3) else i++

$\Phi_i = \Phi_0 + i \times \Phi_\Delta$

For R - a < d < R - b, iteratively test:

1) If $d_i$ > R, then overlap & done (not INSIDE)

2) If $d_i$ < $d_{i-1}$, then $d_{i-1}$ was maximum so no overlap & done (definitely INSIDE; report ENTRY event)

3) else i++

GEOGRAPHICAL BOUNDARY BASED TRACKING

RELATED APPLICATIONS

This application claims the benefit of and priority to U.S. Provisional Application No. 61/104,323, filed Oct. 10, 2008, and to U.S. Provisional Application No. 61/104,327, filed Oct. 10, 2008, both titled "Geofence tracking" and both of which are expressly incorporated herein by reference.

FIELD

This disclosure relates generally to apparatus and methods for wireless tracking of assets. More particularly, the disclosure relates to tracking people or targets across, into or out of geographical boundaries.

BACKGROUND

Geographical boundary based tracking, some times referred to as geofence tracking, is the monitoring of movement of assets such as packages, equipment, vehicles, moving targets and personnel with respect to one or more defined geographic boundaries, regions or areas. The boundary may be imaginary (i.e., without fixed real world fences or boarders) or may be inherently defined (e.g., within the city limits or on a highway). Such tracking may be used to monitor and record the crossing, entry or exit of an asset (such as a vehicle) as it passes the geographical boundary and to alert a system operator of movement activities of the asset if the asset strays from a normal protocol.

A geographical boundary may define and enclose an area (e.g., defined by a circle), a corridor (e.g., defined by a pair of parallel lines), a boarder (e.g., defined by a single line) and the like. Initially, an asset may have an unknown position. Once a position is determined, the position along with its uncertainty may be inside the boundary, outside the boundary or straddling the boundary. An asset straddles a boundary when its area of position uncertain partially overlaps with both sides of the geographical boundary. An asset's location may be established by one or more position fixes. A position fix may be obtained via a single or a combination of a variety of modes or positioning sources, including but not limited to: stand-alone GPS with no system assistance; MS-based (Mobile Station-based) GPS with system assistance for initialization; MS-assisted (Mobile Station-assisted) with an external entity performing the fix; AFLT (Advanced Forward Link Trilateration) based on CDMA sectors triangulation; hybrid based on GPS and CDMA sectors triangulation; and sector center based on sector location. One skilled in the art would understand that other modes as well as various steps for processing the position fix may be used without altering the scope of the disclosure.

Position fixes have various confidence levels due to inherent errors. These inherent errors can greatly affect the reliability of geographical boundary based tracking. If the error level of the position fixes is high, the reliability of such tracking is reduced. The reliability of geographical boundary based tracking may also be reduced when only non-continuous position fixes are available. The level of reliability may depend on the time interval with which position fixes of the asset become available. Additionally, the reliability of geographical tracking may be affected by other conditions, such as the shape of the defined geographical boundary.

SUMMARY OF THE DISCLOSURE

Disclosed is an apparatus, method and system for geographical tracking. The apparatus, method and system for geographical tracking tracks entry and/or exiting of an asset into and/or out of a defined geographical boundary and reports the same. Entry and exit tests compare position fixes with various thresholds and parameters to determine if the asset has entered or exited the geographical boundary. Tests are sequenced such that tests having lower levels of complexity (lower order) are performed before tests having higher levels of complexity (higher order). In this way, most position fixes are processed using computations having a lower order of mathematical complexity than conventionally implemented.

According to some aspects, disclosed is a method for tracking an asset, the method comprising: obtaining a geographical boundary; receiving fix data comprising uncertainty parameters defining an area of uncertainty; determining an over-inclusive area of uncertainty based on at least one of the uncertainty parameters; and determining a relationship between the geographical boundary and the area of uncertainty based on the over-inclusive area of uncertainty, wherein the relationship comprises one of possible relationships comprising (a) a relationship in which the area of uncertainty is completely inside the geographical boundary; (b) a relationship in which the area of uncertainty is completely outside the geographical boundary; and (c) an indeterminate relationship; and reporting an event based on a change from a previous determined relationship.

According to some aspects, disclosed is a geographical tracking device comprising a processor and a memory wherein the memory includes software instructions to: obtain a geographical boundary; receive fix data comprising uncertainty parameters defining an area of uncertainty; determine an over-inclusive area of uncertainty based on at least one of the uncertainty parameters; and determine a relationship between the geographical boundary and the area of uncertainty based on the over-inclusive area of uncertainty, wherein the relationship comprises one of possible relationships comprising (a) a relationship in which the area of uncertainty is completely inside the geographical boundary; (b) a relationship in which the area of uncertainty is completely outside the geographical boundary; and (c) an indeterminate relationship; and report an event based on a change from a previous determined relationship.

According to some aspects, disclosed is a computer-readable medium including program code stored thereon, comprising program code to: obtain a geographical boundary; receive fix data comprising uncertainty parameters defining an area of uncertainty; determine an over-inclusive area of uncertainty based on at least one of the uncertainty parameters; and determine a relationship between the geographical boundary and the area of uncertainty based on the over-inclusive area of uncertainty, wherein the relationship comprises one of possible relationships comprising (a) a relationship in which the area of uncertainty is completely inside the geographical boundary; (b) a relationship in which the area of uncertainty is completely outside the geographical boundary; and (c) an indeterminate relationship; and report an event based on a change from a previous determined relationship.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

FIGS. 1A, 1B, 1C, 2A, 2B, 3A, 3B and 3C are diagrams illustrating exemplary predefined geographic boundaries, in accordance with some embodiments of the present invention. Each geographical boundary is shown defined by a line or an edge 10.

Figure 1A:
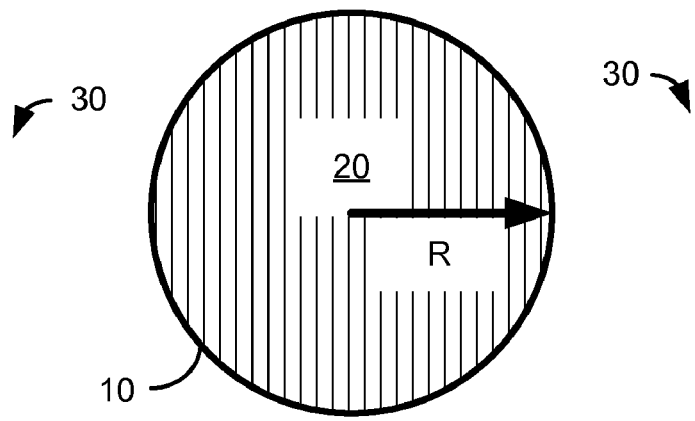
FIGS. 1A, 1B, 1C, 2A, 2B, 3A, 3B and 3C are diagrams illustrating exemplary predefined geographic boundaries, in accordance with some embodiments of the present invention.

In FIG. 1A, a closed area is defined by a single geographical boundary. In this case, the enclosed area 20 defines a circle with radius R and circumference or edge 10. The circle defines a first side or a first area 20 (an area that lies within the circle) and a second side or second area 30 (an area that lies outside of the circle).

Figure 1B:
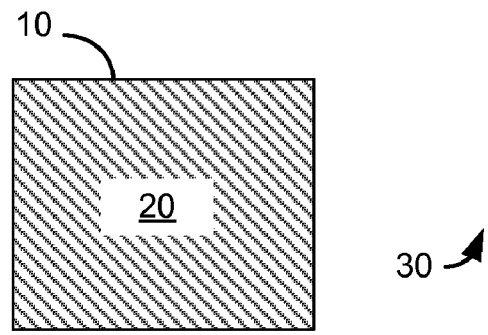
Figure 1C:
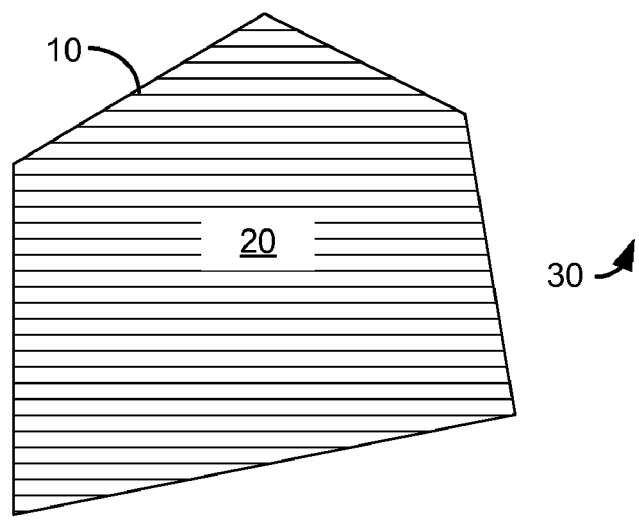

Of course other definable closed areas are possible, such as a rectangle, square, oval, ellipse or combinations of definable shapes, which may be overlapping and/or non-overlapping shapes. In FIG. 1B, a closed area 20 is defined by a rectangle or square 10. In FIG. 1C, a closed area 20 is defined by a polygon.

Figure 2A:
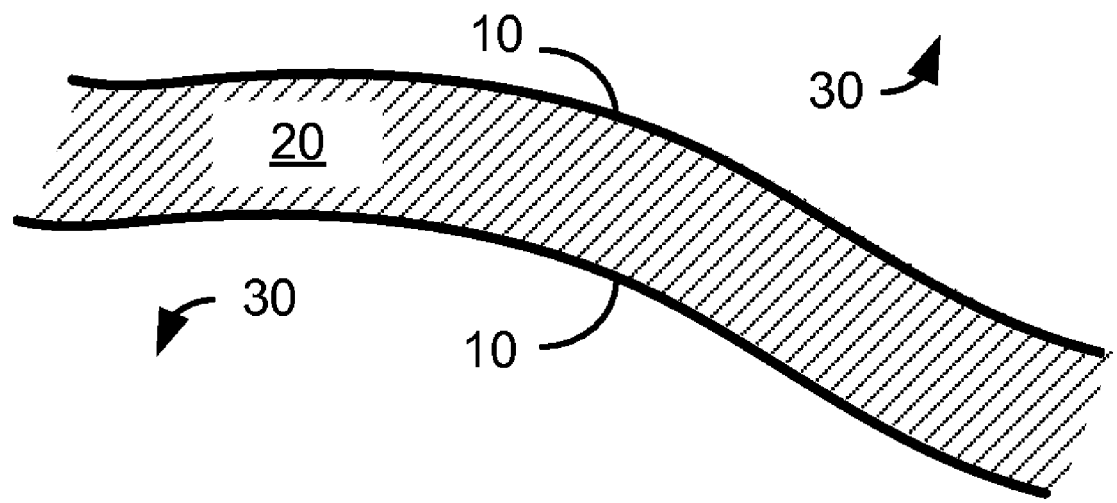
Figure 2B:
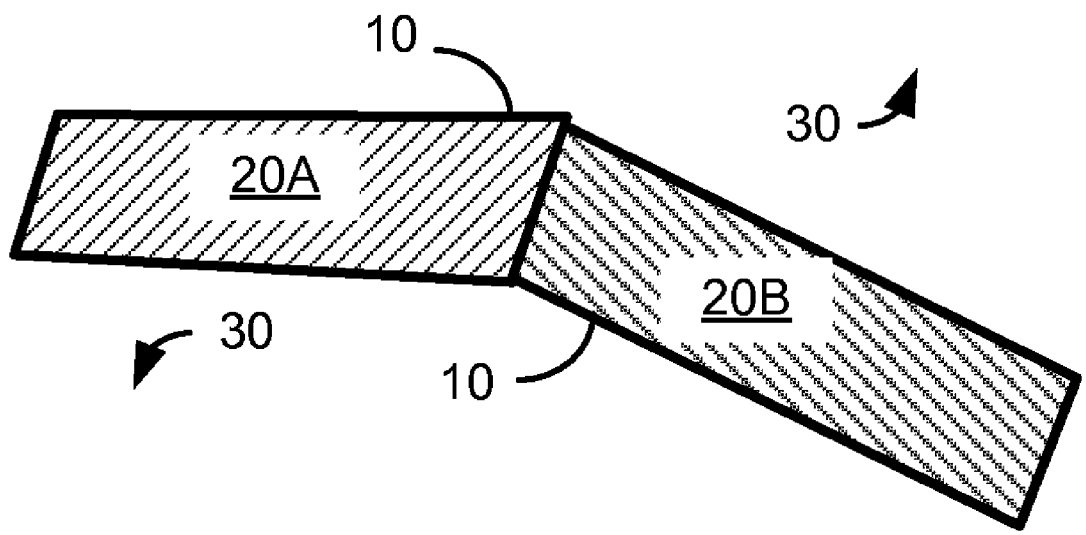

In FIG. 2A, a closed area 20 is defined by a pair of lines or curves 10. Such an area may follow and bound a roadway, railway, shipping channel or other path of travel. The closed area of FIG. 2A may be approximated by a series of polygons such as in FIG. 2B where each polygon defines a sub-area 20A, 20B. Alternatively, the closed area may be defined by a pair of horizontal lines (e.g., defining a strip in the northern hemisphere such as an area between the 45 and 46 parallels). Alternatively, the closed area 20 may be defined by three or more lines 10.

Figure 3A:
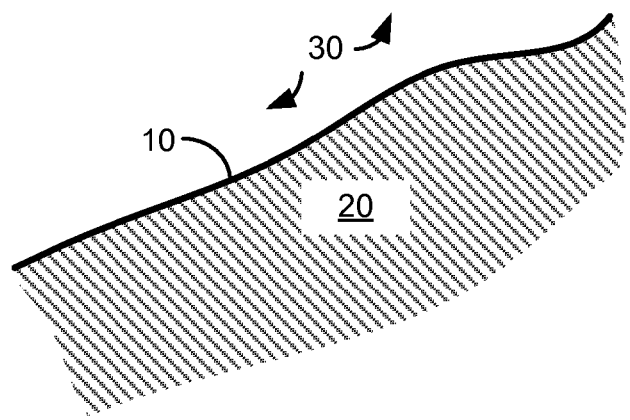
Figure 3B:
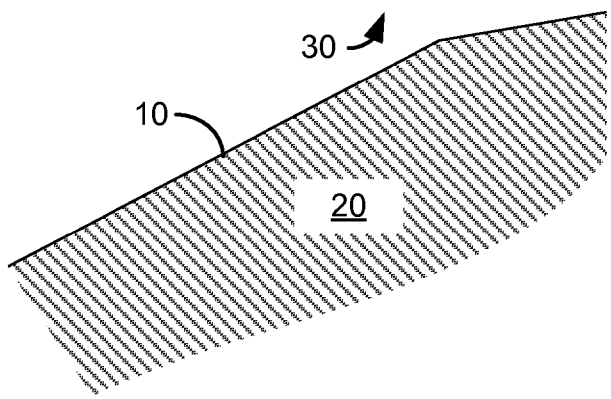

In FIG. 3A, an open area 20 is defined by a geographical boundary 10. The geographical boundary 10 divides an area into a first side 20 and an opposite side 30 of the geographical boundary. In this case, the geographical boundary 10 may be defined as a straight line (e.g., following a longitude or latitude line) or may follow a border (e.g., a border between states or countries), a geographic feature (e.g., the continental divide or a shoreline), or the like. The arbitrary curve of FIG. 3A may be approximated by one or more lines, such as shown in FIG. 3B.

Figure 3C:
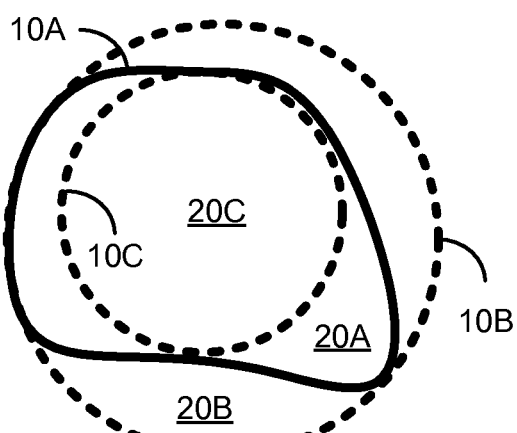

In FIG. 3C, a closed area 20A is arbitrarily shaped by line 10A. In this case, a circle 10B may be used to approximate the arbitrary shape. For example, the circle 10B could be large enough to entirely enclose the arbitrary shape. In this case, the circle 10B would be over inclusive. The circle 10B (having area 20B) may be used to determine with certainty, however, if an asset is outside the arbitrarily shaped area 20A. Similarly, a circle 10C could be as large as possible but still entirely encompassed by the arbitrary shape 10A. In this case, the circle 10C (having area 20C) may be used to determine with certainty if an asset is inside the arbitrarily shaped area.

As described above, each geographical boundary is shown as a fixed line or curve 10. In other embodiments, the geographical boundaries may be different depending on a direction of travel and/or time of travel. For example, the boundary may be defined with a hysteresis boarder. As a simple example, a geographical boundary may be a circle. An asset is determined to be within the geographical boundary when the asset is within the area defined by its radius R. An asset is determined to be outside the geographical boundary when the asset is beyond the area defined by its radius R plus a buffer or hysteresis distance. In this way, an asset resting on the boundary is not determined to be bouncing between being inside and outside a geographical area. The algorithms described below do not explicitly include a hysteresis boundary but may be appropriately modified to include such a hysteresis boundary.

Figure 4:
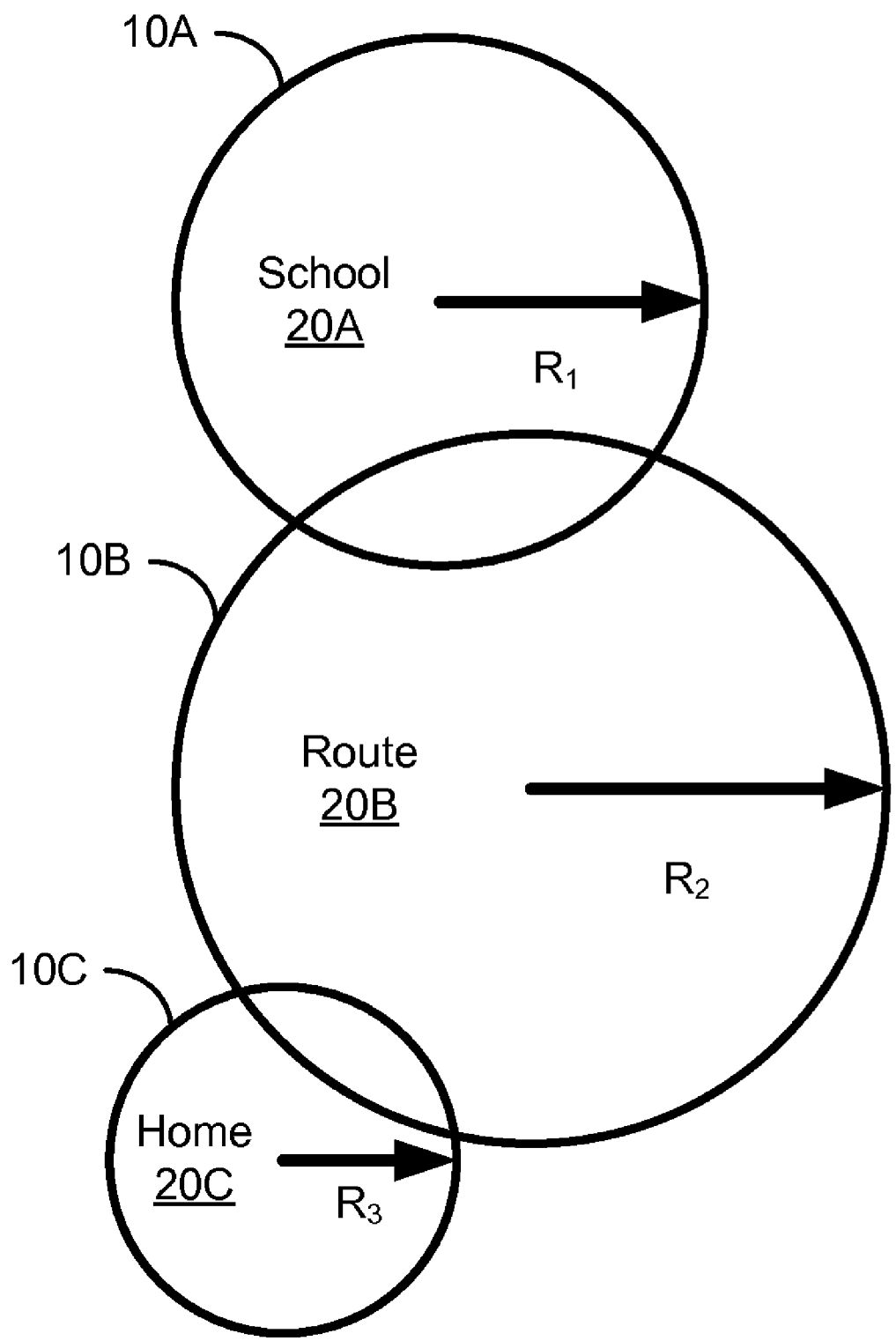
FIG. 4 illustrates time-varying geographic boundaries, in accordance with some embodiments of the present invention.

FIG. 4 illustrates time-varying geographic boundaries, in accordance with some embodiments of the present invention. For example, a first geographical boundary 10A defining a circle with radius $R_1$ and area 20A may be active during school hours and encompass school grounds. A second geographical boundary 10B defining a circle with radius $R_2$ and area 20B may be active during commuting hours and encompass a prescribed route. A third geographical boundary 10C defining a circle with radius $R_3$ and area 20C may be active outside of school and commuting hours and encompass a residence. With such a time-dependent geographical boundary, an asset may be tracked according to where that asset is expected to be located during a predefined time.

Figure 5:
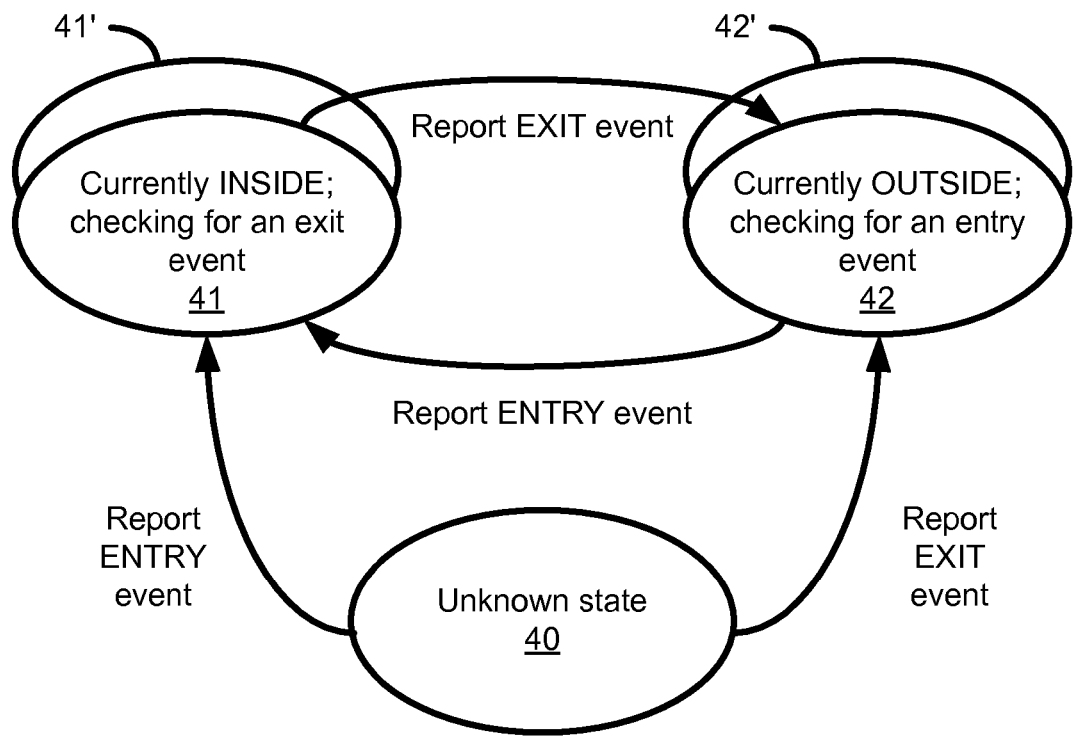
FIG. 5 shows a state diagram, in accordance with some embodiments of the present invention.

FIG. 5 shows a state diagram, in accordance with some embodiments of the present invention. The diagram shows three primary states: an unknown state 40; an inside state 41; and an outside state 42. If no information is known regarding the location of an asset, a system may set the current state to a state indicating the current location is unknown 40. Once a position is known, the state may be set to indicate that the asset is either inside 41 or outside 42 a geographical boundary. If the last or current fix data indicates that the asset is inside 41, the system may focus on detecting whether the asset has exited the geographical boundary. Alternatively, if the last or current fix data indicates that the asset is outside 42, the system may focus on detecting whether the asset has entered the geographical boundary.

In some embodiments, more than a single geographical boundary 10 exists. In these cases, multiple states may be active at one time. That is, a first state 41 may show that an asset is within one boundary and a second state 41' may show that the asset is within an overlapping boundary at the same time. Alternatively, an asset may be currently inside one boundary (state 41 being enabled) and also currently outside of another boundary (state 42' being enabled). In some embodiments, each time the asset changes states and enters a geographical boundary, the system reports an entry event. In some embodiments, each time the asset changes states and exits a geographical boundary, the system reports an exit event.

Fix data may include uncertainty parameters defining an area of uncertainty. Typically, fix data includes a position location fix (such as provided by trilateration or triangulation, by a GPS device or other positioning source or combination of positioning sources) as well as associated location uncertainty information, which may be represented by an error or uncertainty ellipse or other shape, or by one or more variance parameters. In accordance with some embodiments of the present invention, this uncertainty information may be simplified to accelerate determination of an asset's dynamic position with respect to a geographical boundary 10 (i.e., entering, exiting, inside of, or outside of the geographical boundary 10).

Figure 6A:
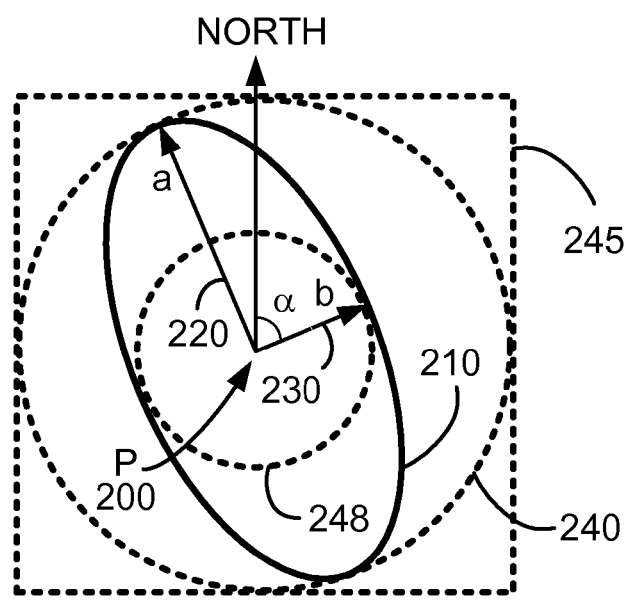
FIGS. 6A and 6B illustrate fix data including uncertainty parameters, in accordance with some embodiments of the present invention.
Figure 6B:
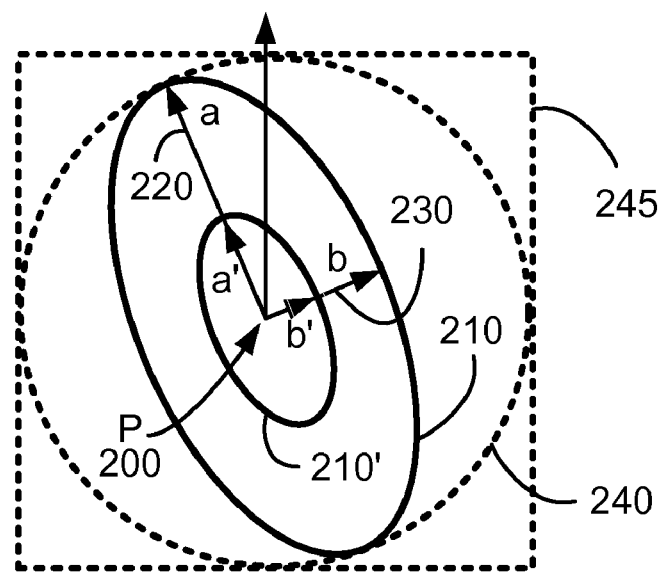

FIGS. 6A and 6B illustrate fix data including uncertainty parameters, in accordance with some embodiments of the present invention. In FIG. 6A, a position fix at point P 200 is shown at the center of the illustration. The position may be defined by longitude and latitude coordinates or the like. Alternatively, the position may be defined by longitude and latitude coordinates along with an altitude. An area of uncertainty surrounding the position defines a region the asset is actually located, within a degree of certainty. The area of uncertainty may define an area that the asset is located within a fixed probability. For example, the asset may be known to be inside the area of uncertainty within a 90% probability. The area of uncertainty may be defined by an uncertainty ellipse 210 having a major axis 220 and a minor axis 230 perpendicular to the major axis 220. The length of the major axis 220, sometimes referred to as a radius, is measured along the greatest span of the ellipse from its center point P 200 to the edge 210. The angles of the major axis 220 and the minor axis 230 for the position uncertainty ellipse 210 may be further identified by an angle offset α from true North.

To reduce computational complexities further, at the cost of accuracy, the uncertainty ellipse 210 may be simplified and represented by a circle 240 having a radius at least equal to the length of the major axis 220. In this way, the geographic area of uncertainty defined by the circle 240 is over inclusive and fully contains the uncertainty area defined by the ellipse 210. Furthermore, the uncertainty ellipse 210 may be simplified and represented by a square 245 having sides in length at least equal to the twice the length of the major axis 220. Also shown is an interior circle 248 (also referred to as a core area or an under-inclusive area) used to determine if the uncertainty area within ellipse 210 partially overlaps the geographical boundary as described with reference to FIGS. 17 and 18.

FIG. 6B shows two ellipses of uncertainty representing a common position but with different probabilities. A positioning system provides fix data with an original area of uncertainty 210' (defined by a major axis a' and a minor axis b') with an associated probability. That is, an asset is known to be within the area of uncertainty within some fix probability. For example, an area of uncertainty may represent a 50% probability area of uncertainty. Therefore, the likelihood that the asset is within this original area 210' is 50%. This original area of uncertainty 210' may be modified to include the asset at a higher probability. For example, the original area of uncertainty 210' may be increase to a first area of uncertainty 210. This first area of uncertainty 210 may represent an uncertainty of 90%. Therefore, the likelihood that the asset is within this area is 90%. The first area of uncertainty 210 defined by a major axis 220 and a minor axis 230. In some embodiments, the ratio of a:a' and b:b' is a common constant (e.g., $$\frac{a}{a'} = \frac{b}{b'} = c$$).

Alternatively, the original area of uncertainty 210' may be formed such that different ratios are used (e.g., $$\frac{a}{a'} \neq \frac{b}{b'}$$).

In these cases: (a) a'>a and b'>b; (b) a'>a and b'<b; or (c) a'<a and b'>b. This first area of uncertainty 210 may be generalized as an over-inclusive area of uncertainty, as explained above, by a circle 240 or a square 245. When discussing areas of uncertainty in the text below, this area is associated with a known probability appropriately set (e.g., to 90%) for the application at hand.

Figure 7:
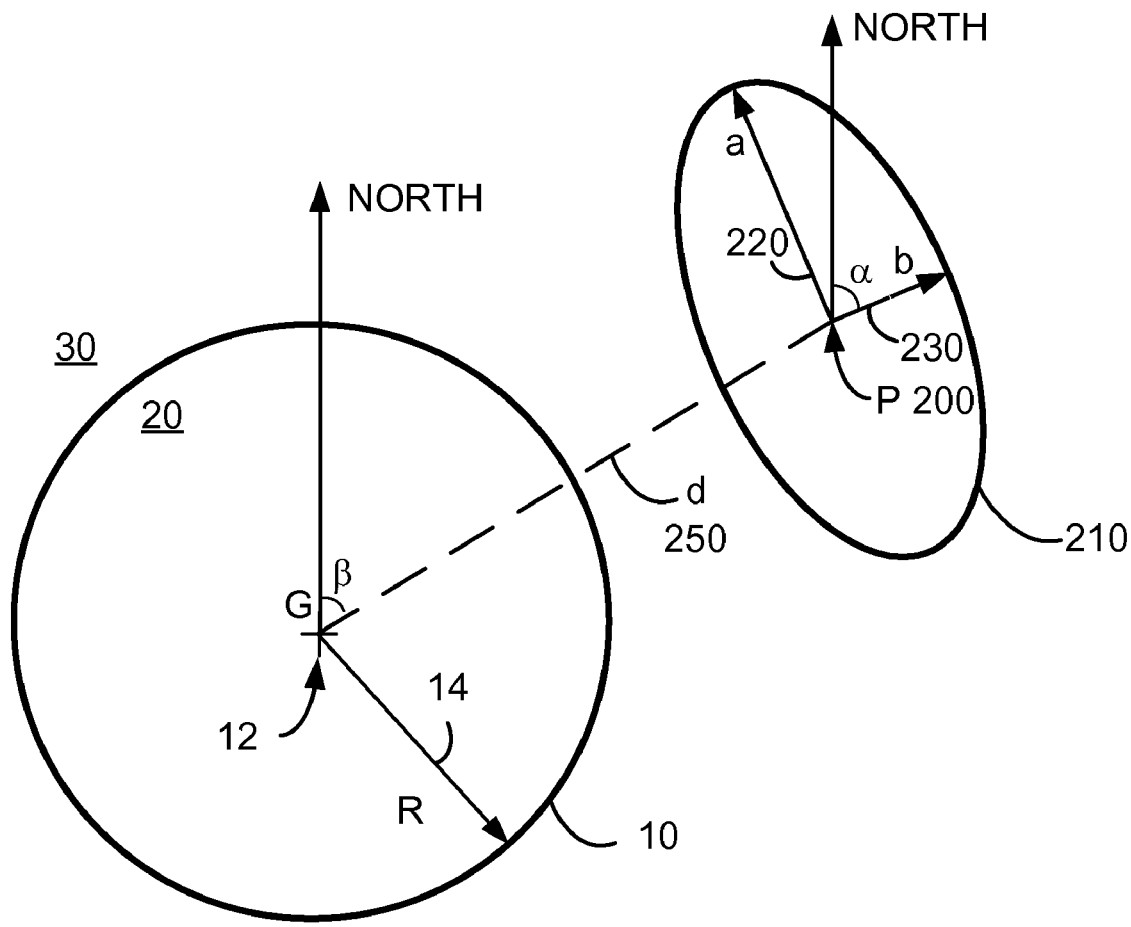
FIGS. 7 and 8A through 8F illustrate fix data in relation to a geographical boundary, in accordance with some embodiments of the present invention.

FIGS. 7 and 8A through 8F illustrate fix data in relation to a geographical boundary, in accordance with some embodiments of the present invention. FIG. 7 shows a predetermined geographical boundary 10 and an area of uncertainty 210. The predetermined geographical boundary 10 has a center position G 12 and a radius R 14 defining an area 20. Locations not in area 20 are in area 30. The asset's position P 200 centered in an uncertainty ellipse 210 defined by a major axis 220, a minor axis 230 and an offset angle α from magnetic north. If necessary, the uncertainty ellipse has previously been adjusted to represent an appropriate level of uncertainty (e.g., 90%). The center point G 12 of the geographical boundary 10 and the center point P 200 of the area of uncertainty 210 are separated by a distance d 250, which may be represented by a vector of length d and offset by an angle β from north.

FIGS. 8A to 8F show a sequence of scenarios in which a predetermined geographical boundary 10 defines an area 20 that either overlaps or does not overlap with one or more of an uncertainty ellipse 210, a circle of uncertainty 240 and a position fix P 200. The sequence of scenarios show an area of uncertainty (defined by the ellipse 210) at various positions relative to the predetermined geographical boundary 10. By using an uncertainty circle 240 and representing the locations G 12 and P 200 in polar coordinates, the determination of whether the uncertainty circle 240 is entirely within or entirely outside the predetermined geographical boundary 10 is computationally reduced to a difference or sum calculation as described below. If the uncertainty circle 240 overlaps the predetermined geographical boundary 10, additional calculations may be made to determine whether the uncertainty ellipse 210 is entirely within, entirely outside or also overlapping.

Figure 8A:
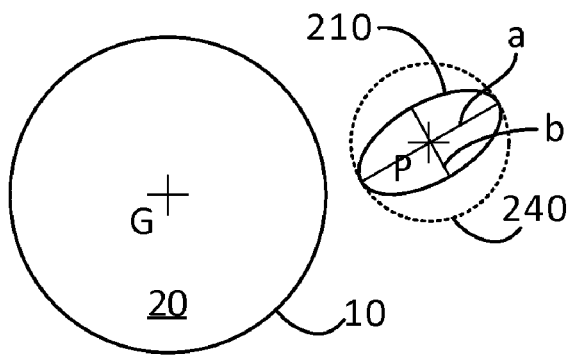

FIG. 8A shows a scenarios in which the predetermined geographical boundary 10 does not overlap either of the uncertainty ellipse 210 or the circle of uncertainty 240 and does not encompass the position fix P 200. In this case, the distance d will be greater than the sum of the radius G and the radius 220 of the uncertainty circle 240. That is, if d>R+a, then the unknown position of the asset is certainly outside of the geographical boundary 10 and entirely in the area 30, therefore the uncertainty ellipse 210 and point P 200 are also outside of the geographical boundary 10.

Figure 8B:
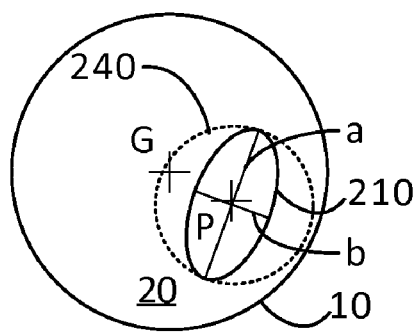

FIG. 8B shows a complimentary scenarios in which the predetermined geographical boundary 10 encompasses each of the uncertainty ellipse 210, the circle of uncertainty 240 and the position fix P 200. In this case, the distance d will be less than the difference of the radius R and the radius 220 of the uncertainty circle 240. That is, if d<R-a, then the unknown position of the asset is certainly inside of the geographical boundary 10.

Described above are the computations involved with determining if an over inclusive area of uncertainty 240 falls completely outside or completely inside a geographical boundary 10 bounding the area 20. Using a circular area 20 and a region of uncertainty generalized by a circle 240 allows the computation become relatively straight forward. Similarly, if the area 20 and region of uncertainty 210 are generalized to rectangles, the computations are equally as straight forward.

If the distance between the center locations G 12 and P 200 is between these ranges described above (i.e., G-a<d<G+a), then the uncertainty circle 240 overlaps with the predetermined geographical boundary 10. Further testing is performed in order to determine whether the uncertainty ellipse 210 also overlaps with the predetermined geographical boundary 10. The following four figures show four different scenarios in which the uncertainty circle 240 partially overlaps the geographical boundary 10 but the uncertainty ellipse 210 is either divided or does not overlap with the geographical boundary 10. If the uncertainty ellipse 210 is not divided, then the position of the asset is known (at least within a predetermined probability of uncertainty) to be either inside or outside the predetermined geographical boundary 10.

Figure 8C:
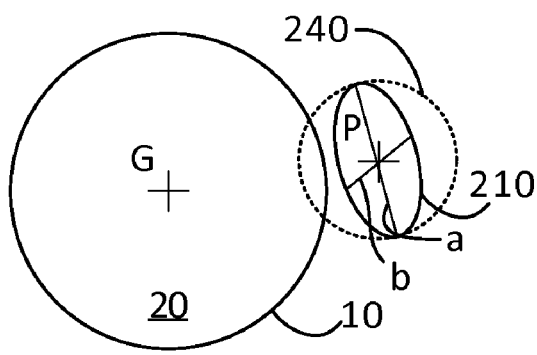

FIG. 8C shows a scenarios in which the predetermined geographical boundary 10 overlaps with the uncertainty circle 240 but happens not to overlap with the uncertainty ellipse 210 and therefore does not encompass the position fix P 200. In this case, the distance d will be greater than the radius R but less than the sum of the radius R and the radius 220. That is, if G<d<G+a, the circle of uncertainty 240 overlaps with the area 20. Depending on the orientation of the major axis of the uncertainty ellipse 210 and its geometry with respect to the heading $\beta$ of the direction vector, the uncertainty ellipse 210 might be completely outside of or partially overlapping the area 20 as shown here. An additional test is performed to determine whether the uncertainty ellipse 210 is free from or also overlaps with the area 20. In this case, the uncertainty ellipse 210 is shown not to overlap with the area 20. For comparison, see FIG. 8E and the associated description below.

Figure 8D:
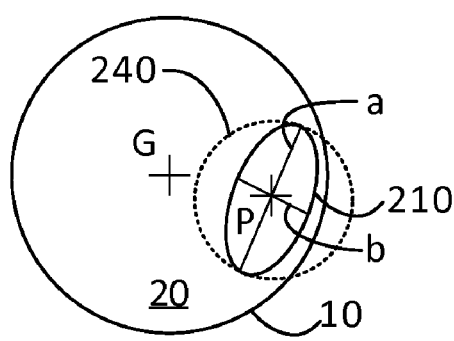

FIG. 8D shows a complementary scenario in which the predetermined geographical boundary 10 overlaps with the uncertainty circle 240 but also happens to completely encompass the uncertainty ellipse 210. In this case, the distance d will be greater than the radius R less the radius 220 but less than the radius R. That is, if R-a<d<R, the circle of uncertainty 240 overlaps with the area 20. Depending on the orientation of the major axis of the uncertainty ellipse 210 and it geometry with respect to the heading $\beta$ of the direction vector, the uncertainty ellipse 210 might be completely inside of or partially overlapping the area 20. An additional test is performed to determine whether the uncertainty ellipse 210 is encompassed by or also partially overlaps the area 20. In this case, the uncertainty ellipse 210 is shown to be completely encompassed by the area 20. For comparison, see FIG. 8F and the associated description below.

Figure 8E:
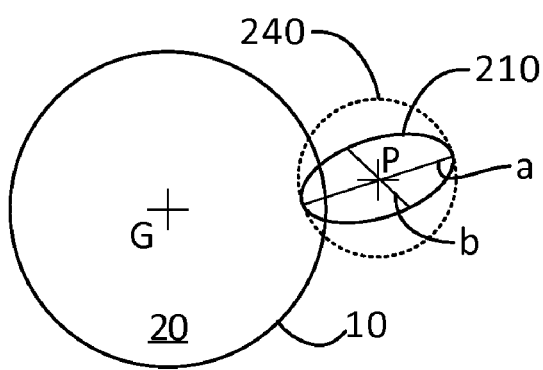

FIG. 8E shows a scenarios in which the predetermined geographical boundary 10 happens to overlap with the uncertainty ellipse 210 but does not encompass the position fix P 200. In this case, the distance d will be greater than the radius R but less than the sum of the radius R and the radius 220. That is, if G<d<R+a, the circle of uncertainty 240 overlaps with the area 20 but the point P is outside of the area 20.

Figure 8F:
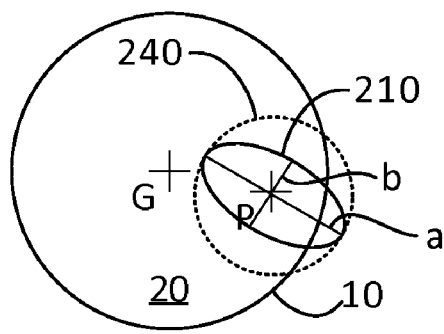

FIG. 8F shows a scenarios in which the predetermined geographical boundary 10 happens to overlap with the uncertainty ellipse 210 and also encompass the position fix P 200. In this case, the distance d will be greater than the radius R less the radius 220 but less than the radius R. That is, if R-a<d<R, the circle of uncertainty 240 overlaps with the area 20 but the point P is inside of the area 20.

As an overview, by using the computations described with relation to FIGS. 8A and 8B, a system may determine whether the uncertainty circle 240 does not overlap with the predetermined geographical boundary 10 (i.e., the distance between the center locations G 12 and P 200 falls within a predetermined range). If the uncertainty circle 240 intersects with the predetermined geographical boundary 10, it remains unknown whether the uncertainty ellipse 210 also intersects with the predetermined geographical boundary 10. In this case, further processing may be used to determine if the uncertainty ellipse 210 is divided by the predetermined geographical boundary 10. Alternatively, a new position fix may be made resulting in a new position having an area of uncertainty that is the same, smaller or larger than the previous fix. That is, the new position fix may be made using the same parameters; however, the resulting fix may have a larger area of uncertainty. In some embodiments, the new position fix may be made using an increased integration time to help improve accuracy and attempt to reduce the area of a new uncertainty ellipse. The computation used to determine whether the circle of uncertainty 270 is completely outside or completely inside the predetermined geographical boundary 10 may be skipped by performing a second more accurate position fix.

FIGS. 9A, 9B, 10A, 10B, 11, 12A, 12B and 12C show flow charts of exemplary geographical tracking algorithms, in accordance with some embodiments of the present invention.

Figure 9A:
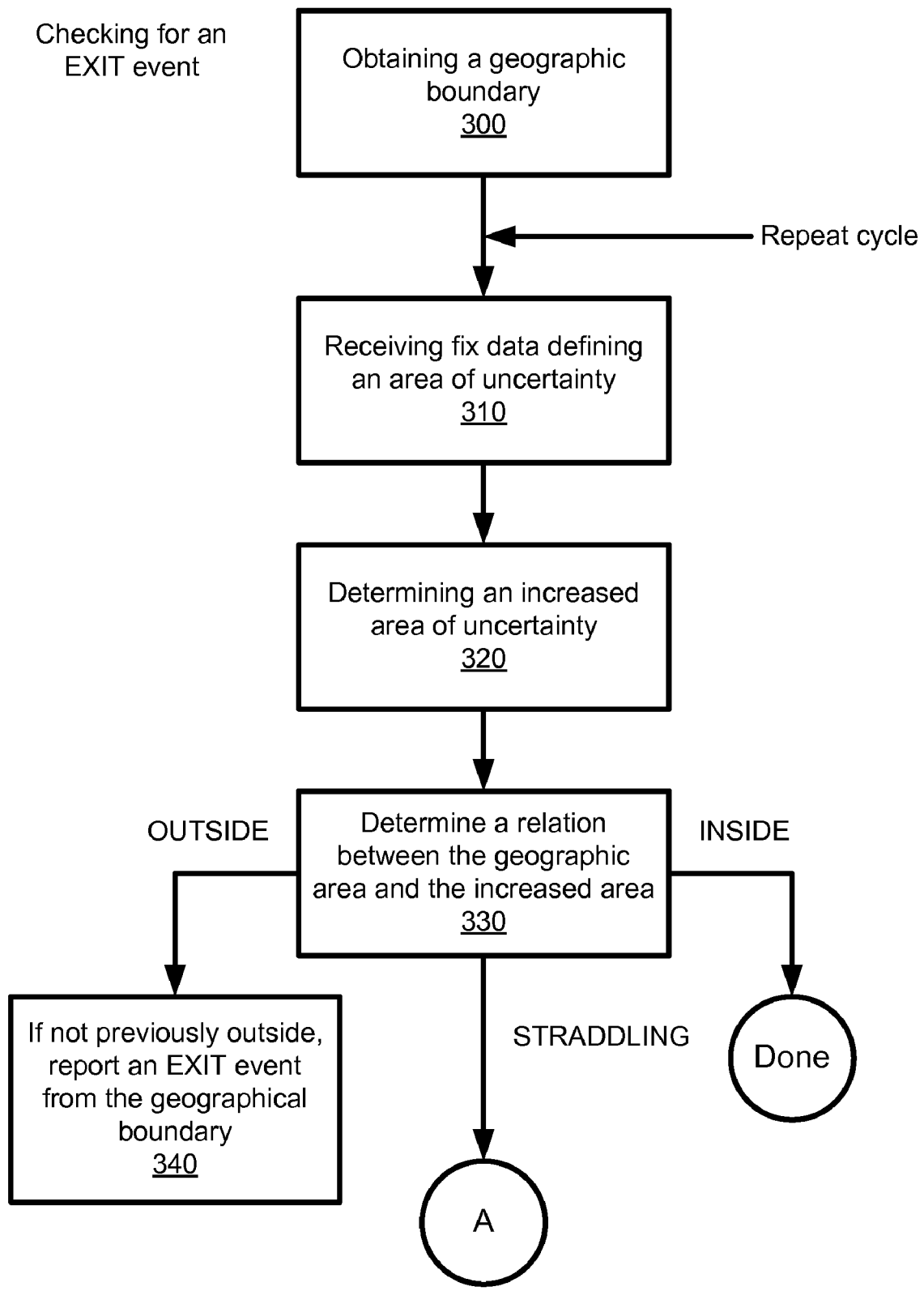
FIGS. 9A, 9B, 10A, 10B, 11, 12A, 12B and 12C show flow charts of exemplary geographical tracking algorithms, in accordance with some embodiments of the present invention.
Figure 9B:
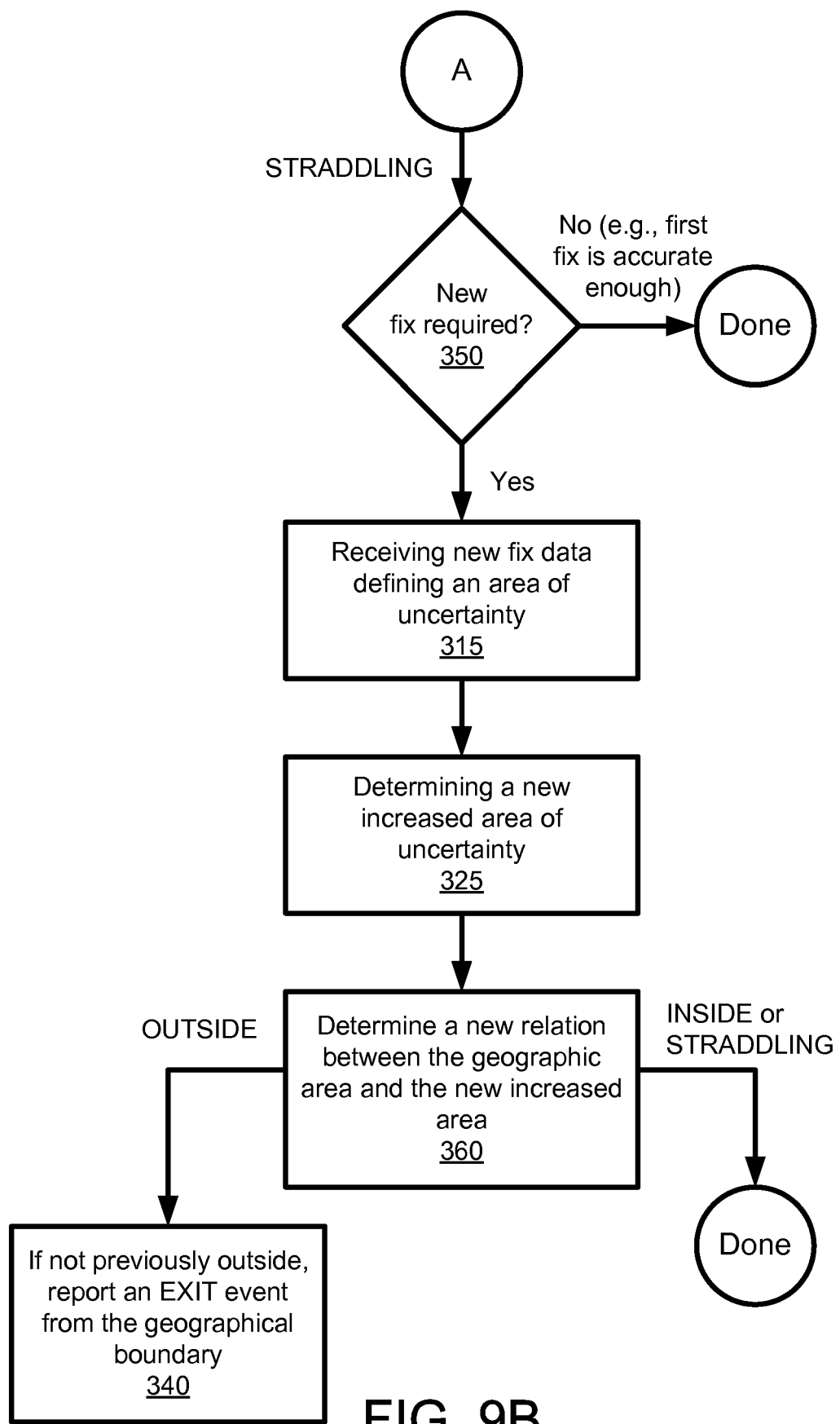

FIGS. 9A and 9B show a process for a system to check for an exit event (i.e., when an asset leaves a designated area 20). The system may be use a single processor or may use multiple processor co-located or located at separate locations. At 300, the system obtains the definition for a geographical boundary 10. This geographical boundary 10 may be retrieved locally (e.g., from memory) or obtained remotely. This geographical boundary 10 may be provided as a closed area such as a circle (a center point G 12 and a radius R) or polygon. Alternatively, the geographical boundary 10 may be define as a line, a plurality of closed areas, and/or as a function of time other shapes as described above. For simplicity, a circle with a radius R will be used below.

Next, a cycle of receiving and processing asset position data begins. At 310, the system receives fix data defining an original area of uncertainty 210'. At step 320, the system converts the area of uncertainty 210 to a simpler form. That is, the system determines an increased area of uncertainty (e.g., a circle of uncertainty 240) based on at least one of the uncertainty parameters, such as a major axis 220 of defining the area of uncertainty 210.

At 330, the system determines a relationship between the geographical boundary 10 and the increased area of uncertainty 240. Based on tests described in further detail below, the system determines whether: (a) the increased area of uncertainty 240 is completely inside the geographical boundary 10; (b) the increased area of uncertainty 240 is completely outside the geographical boundary 10; or (c) the increased area of uncertainty 240 is straddling or overlapping the geographical boundary 10.

If the relationship indicates the increased area of uncertainty 240 is completely inside the geographical boundary 10, then the asset has not left the geographical boundary 10 and no further processing is necessary until a next fix data is available for processing.

If the relationship indicates the increased area of uncertainty 240 is completely outside the geographical boundary 10, then at 340, if it was not previously outside, the system may report an exit event where the asset is reported to have left the geographical boundary 10.

If the relationship indicates the increased area of uncertainty 240 is straddling or overlapping the geographical boundary 10, further processing may be halted until the next fix data is available for processing. At this point, the process may be repeated at 310. Alternatively, additional tests may be performed to more accurately determine the relationship between the area of uncertainty 240 and the geographical boundary 20 or an additional fix may be requested.

FIG. 9B illustrates additional processing when the relationship indicates the boundaries 10 and 240 are intersecting thereby their areas are straddling each other. At 350, the system may determine whether a new fix would be beneficial. If it would not be beneficial, processing may stop until the next cycle. For example, if the current fix is highly accurate (i.e., the area of uncertainty 210 is relatively small), processing may stop and wait for the next position fix to begin again at 310. In this case, a parameter of uncertainty is compared to a threshold to determine whether the uncertainty is below a threshold value. Alternatively, a fix may not be beneficial if too many position fixes have been taken where each has resulted in a straddling outcome. Alternatively, step 350 may be skipped and additional testing (as described below at 360) may be performed.

If a new fix would be beneficial, processing continues at 315 where the system receives new fix data defining a new center point and a new area of uncertainty. At 325, this new area of uncertainty is increase as described before at 320.

At 360, the system again determines a new relationship between the geographic area and the new increased area. At 340, if the determined relationship indicates that the new uncertainty is outside the geographical boundary 10, the system reports an exit event by the asset from the geographical boundary 10. If the new relationship indicates the areas are straddling or one is still entirely inside the other, processing may stop until the next cycle.

Figure 10A:
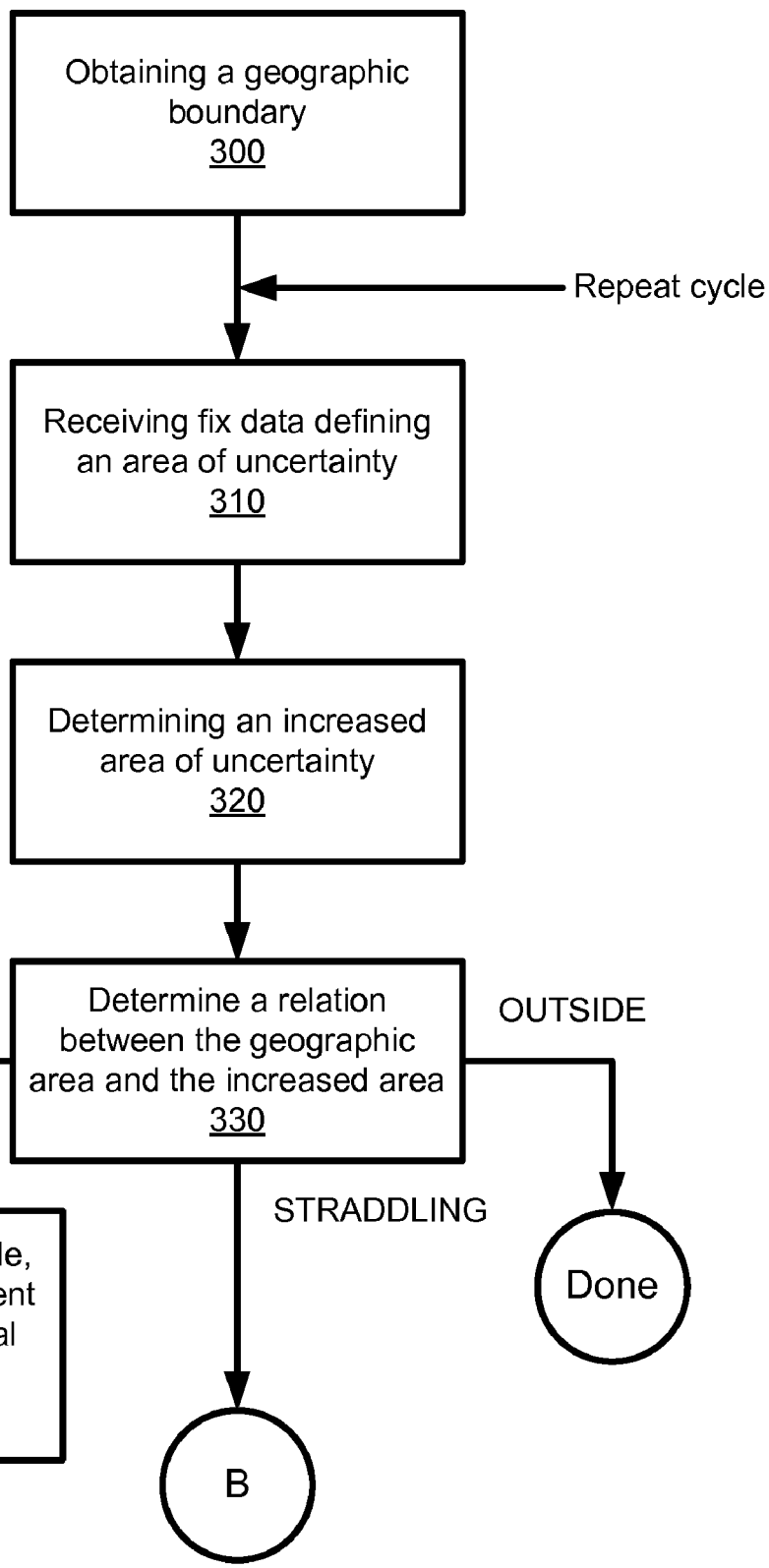
Figure 10B:
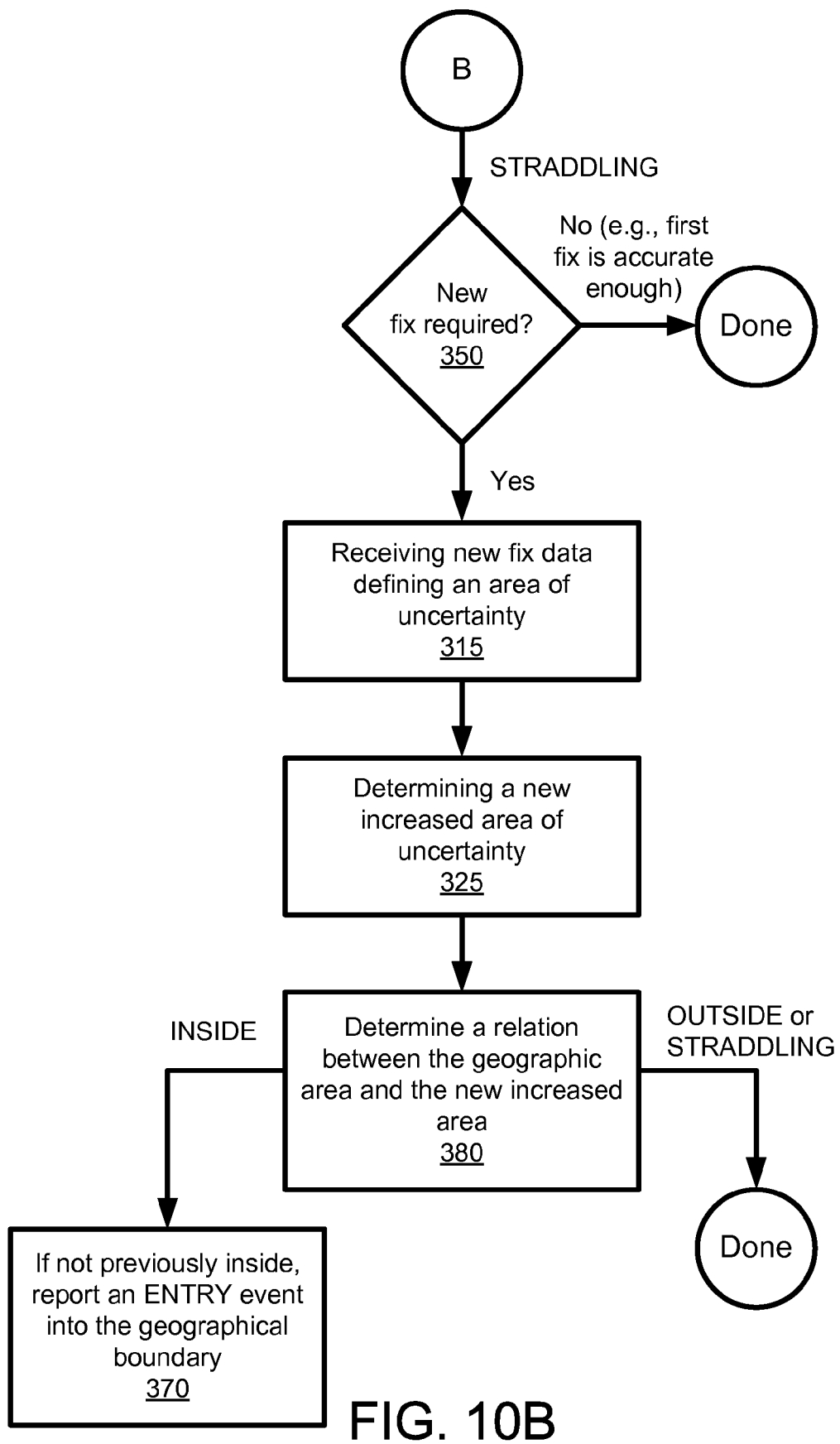

The method described above may be used to track an asset leaving a geographic area 20. A similar method may be used to track an asset entering an area 20 as shown in FIGS. 10A and 10B. In FIG. 10A at 300, a system obtains the definition of a geographical boundary 10 as described above. A cycle begins at 310 when the system receives fix data defining an area of uncertainty 210. At 320, the system determines an increase area of uncertainty 240 as described above.

Next at 330, the system determines the relationship between the geographical boundary 10 and the increased area of uncertainty. The determined relationship will indicate one of three outcomes: (a) the increased area of uncertainty 240 is completely inside the geographical boundary 10; (b) the increased area of uncertainty 240 is completely outside the geographical boundary 10; and (c) the increased area of uncertainty 240 is straddling or overlapping the geographical boundary 10.

If the relationship indicates the increased area of uncertainty 240 is completely outside the geographical boundary 10, then the asset has not entered the geographical boundary 10 and no further processing is necessary until a next fix data is available for processing.

If the relationship indicates the increased area of uncertainty 240 is completely inside the geographical boundary 10, then at 370, if it was not previously inside, the system may report an entry event reporting that the asset has entered the geographical boundary 10.

If the relationship indicates the increased area of uncertainty 240 is straddling or overlapping the geographical boundary 10, further processing may be halted until the next fix data is available for processing. At this point, the cycle may repeat by returning to step 310. Alternatively, additional tests may be performed to more accurately determine the relationship between the area of uncertainty 210 and the geographical boundary 10 or an additional fix data may be requested.

FIG. 10B illustrates additional processing when the relationship indicates the areas are straddling each other. At 350 as described above with reference to FIG. 9B, the system may determine whether a new fix would be beneficial. If it would not be beneficial, processing may wait for the next cycle to repeat again at step 310. If a new fix would be beneficial, processing continues at 315 where the system receives new fix data defining a new center point and a new area of uncertainty. At 325, this new area of uncertainty is increase as described above with reference to step 320 in FIG. 9A.

At 380, the system determines a new relationship between the geographic area and the new increased area. If the determined relationship indicates that the new increased area of uncertainty falls completely inside the geographical boundary 10, the system reports an entry event to report the asset is within the geographical boundary 10. If the new relationship indicates the areas are straddling or one is still outside the other, processing may stop until the next cycle. Alternatively, the steps of FIG. 10B may be repeated.

Figure 11:
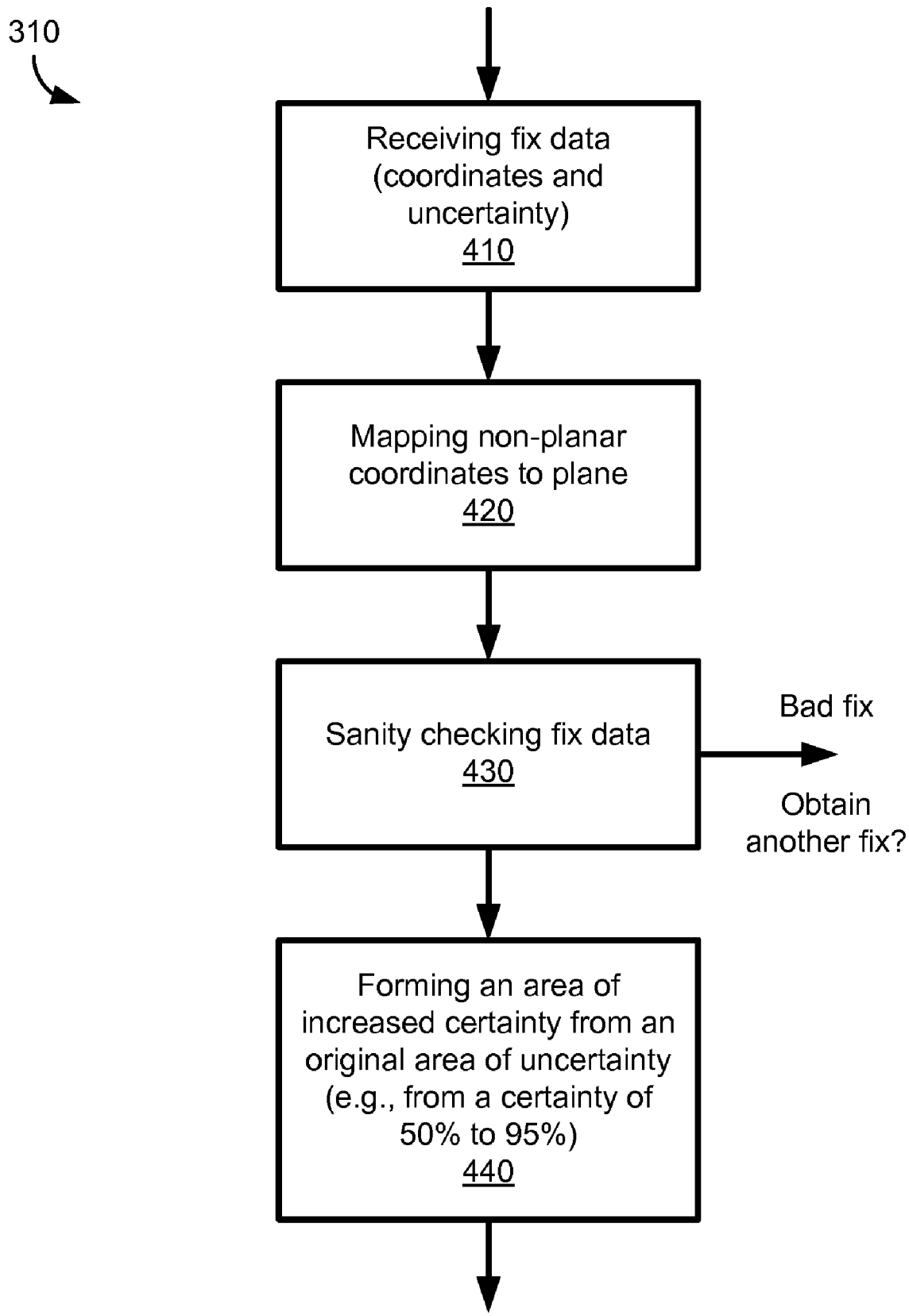

FIG. 11 shows an example implementation of step 310 to receive fix data defining an area of uncertainty (from FIGS. 9A and 10A described above). At 410, the system receives fix data, which may include position coordinates and uncertainty parameters. If the fix data includes longitude and latitude coordinates or other non-planar coordinates, at 420, the system maps these non-planar coordinates to planar coordinates. The center point G 12 of the geographic area 20 may be used as a reference point. Such a reference point leads to more accurate mapping near the reference point and less accurate mapping at points farther away from the reference point. That is, points near point G 12 have a lower level of distortion than points farther away from point G 12.

At 430, the system may perform a sanity check of the fix data thereby eliminating positions that may be erroneous. Sanity checking may involve checking a position, a distance, a speed, a velocity and/or an acceleration associated with a current position measurement with one or more previous position measurements. For example, a position may be checked such that only known positions (within a predetermined range) are valid. Alternatively or in addition, a distance from a current position to a previous position may be compared to a threshold. A speed (distance/duration) may be compared to another threshold. An acceleration based on at least three positions may be compared to yet another threshold. Furthermore, the position source may provide warnings and/or error flags received that the system uses to validate or discard position fixes.

At 440, the system may increase the certainty (e.g., from 50% to 95%) by increasing the area of the provided area of uncertainty. Some position uncertainty areas are referenced to an inclusiveness of 50%. That is, an asset is known to be within the area of uncertainty by a probability of 50%. These uncertainties may be modified to provide more accurate entry and/or exit reporting. The system forms an area of uncertainty 210 from an original area of uncertainty 210' by increasing a certainty associated with the original area of uncertainty 210' thereby resulting in the area of uncertainty 210. This area of uncertainty 210 is used by the system as described below. This process is described above with relation to FIG. 6B.

In some embodiments, step 410 is performed but steps 420, 430 and 440 are not performed. In other embodiments, step 410 is performed with steps 420, 430 and/or 440. For example, a system may receive the fix data (410) and map the fix data to a plane (420). Alternatively, a system may receive the fix data (410) and then check the fix data for validity (430). Alternatively, a system may receive the fix data (410) and then increase certainty.

Figure 12A:
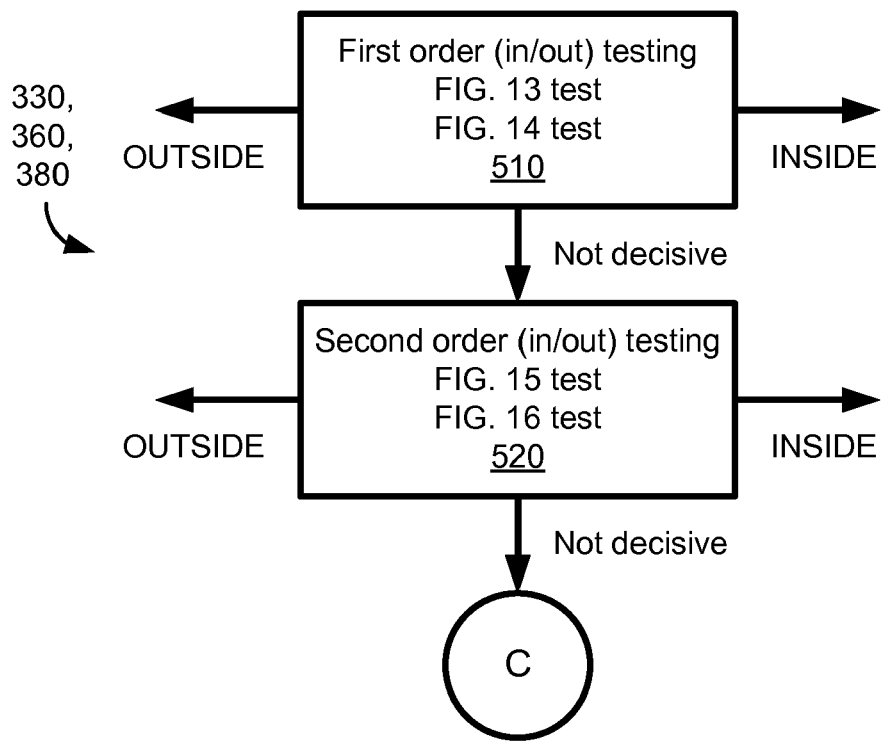

FIG. 12A shows additional detail of step 330 and the beginning of steps 360 and 380 from FIGS. 9A, 9B, 10A and 10B described above. Tests are sequenced such that tests having lower levels of complexity (lower order) are performed before tests having higher levels of complexity (higher order). In this way, most position fixes are processed using computations having a lower order of mathematical complexity than conventionally implemented. At 510, a system executes one or more first order tests to determine if an area of uncertainty is outside or inside the geographical boundary 10. The first order tests are executed until a definitive result is obtained or until the first order tests have been exhausted. The first order tests are described below with reference to FIGS. 13 and 14.

At 520, the system executes one or more second order tests to determine if the area of uncertainty is outside or inside the geographical boundary 10. The second order tests are executed until a definitive result is obtained or until the second order tests have been exhausted. The second order tests are described below with reference to FIGS. 15 and 16.

Figure 12B:
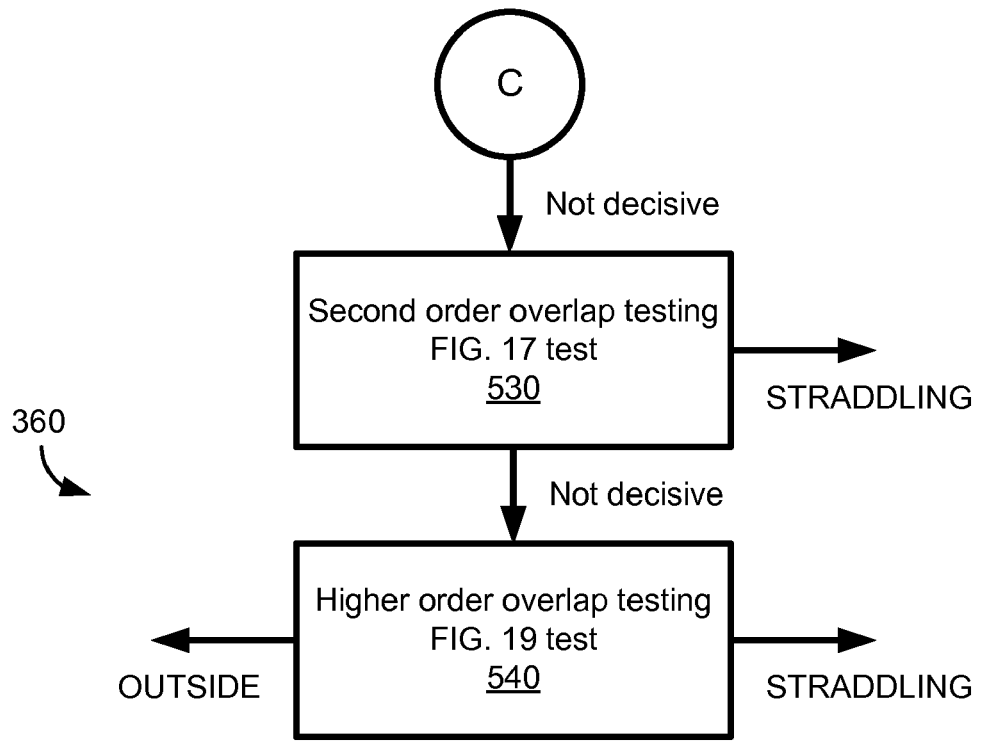

FIG. 12B further illustrates step 360 of FIG. 9B and checking for an exit event. If tests from steps 510 and 520 are indecisive, processing continues at step 530. At 530, the system performs a second order test to determine whether the core of the uncertainty area is straddling the geographical boundary 10 (partially inside and partially outside). The core of the uncertainty area is an under-inclusive area. That is, the core area is completely within the area of uncertainty but does not include all of the area of uncertainty. This second order test is described below with reference to FIG. 17.

If the test is indecisive, processing continues at step 540. At 540, higher order overlap testing is performed to determine whether the uncertainty area is outside the geographical boundary 10. Higher order overlap testing is more computationally intensive than second order testing. This higher order test is described below with reference to FIG. 19.

Figure 12C:
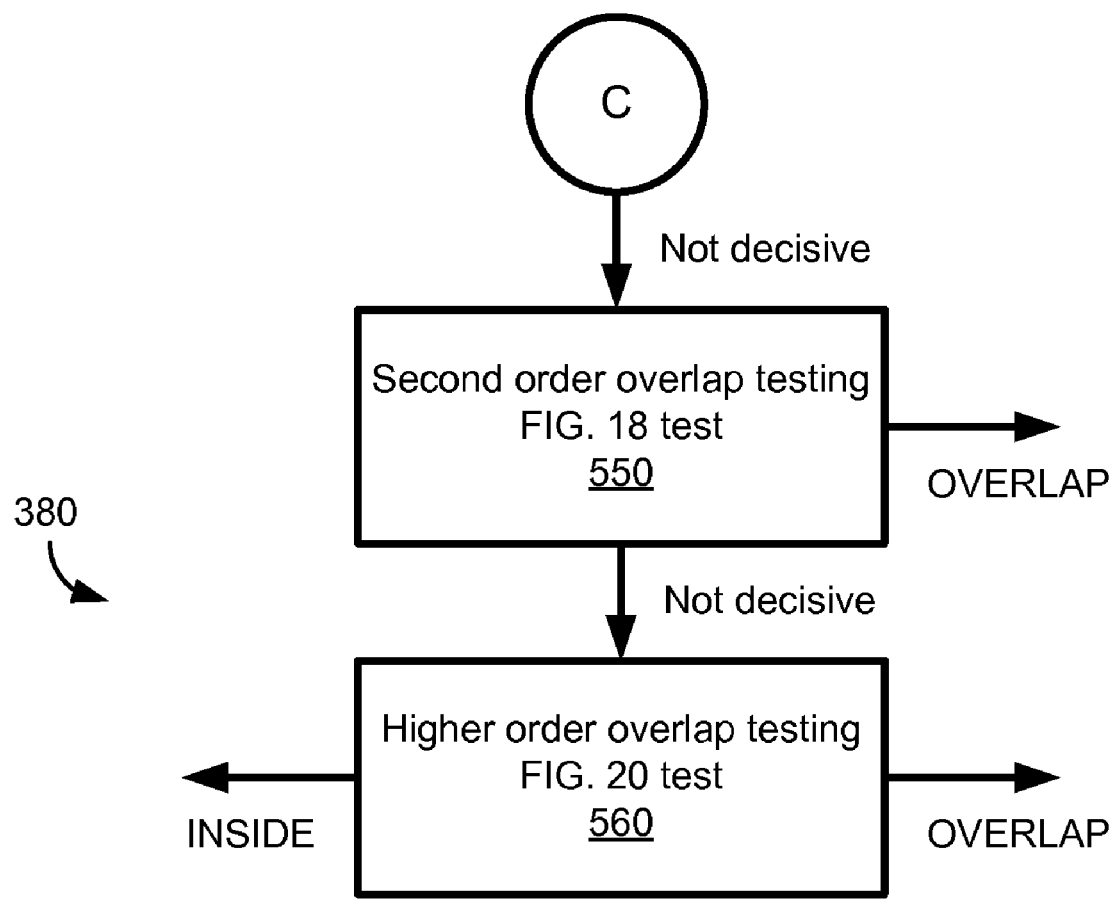

FIG. 12C further illustrates step 380 of FIG. 10B and checking for an entry event. If tests from steps 510 and 520 are indecisive, processing continues at step 550. At 550, the system performs a second order test to determine whether the core of the uncertainty area is straddling the geographical boundary 10 (partially inside and partially outside). This second order test is described below with reference to FIG. 18.

If the test is indecisive, processing continues at step 560. At 560, higher order overlap testing is performed to determine whether the uncertainty area is inside the geographical boundary 10. This higher order test is described below with reference to FIG. 20.

FIGS. 13, 14, 15, 16, 17, 18, 19 and 20 illustrate various tests to determine whether an asset is inside, outside, not inside, not outside or straddling a geographical boundary, in accordance with some embodiments of the present invention.

Figure 13:
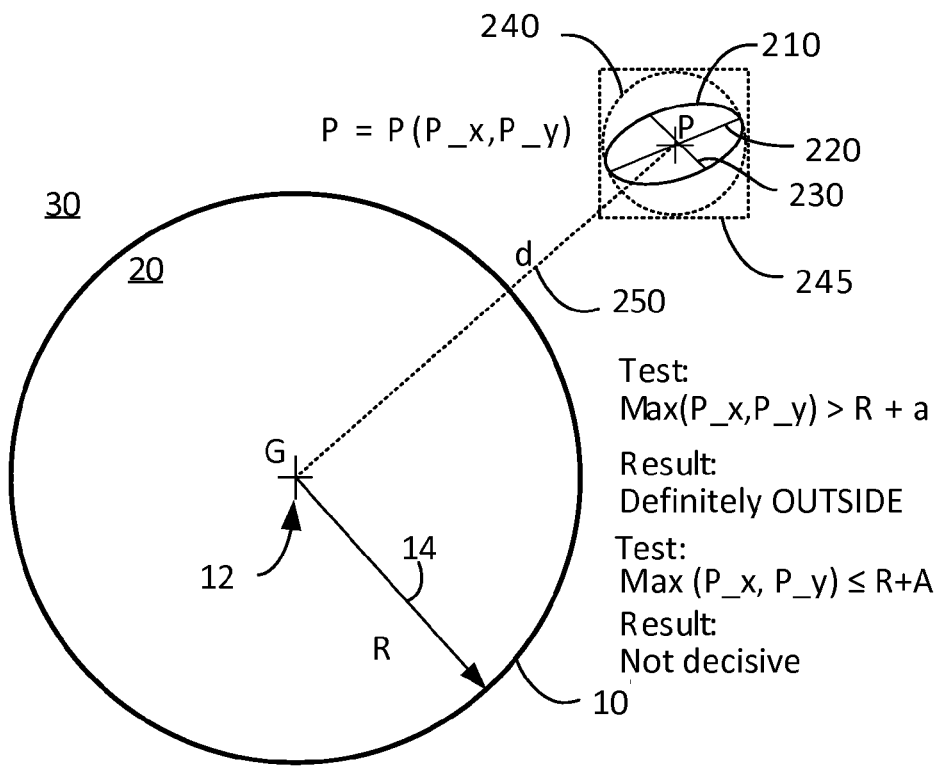
FIGS. 13, 14, 15, 16, 17, 18, 19 and 20 illustrate various tests to determine whether an asset is inside, outside, not inside, not outside or straddling a geographical boundary, in accordance with some embodiments of the present invention.

FIG. 13 shows a first order test used to determine whether an area of uncertainty is outside a geographic area 20. A first order test operates with additions (and/or subtractions) to obtain a result. This test determines whether an over-inclusive generalized form of the area of uncertainty 210 is completely outside the area 20 enclosed by the geographical boundary 10. If the generalized area is outside the area 20, then the area of uncertainty 210 is also outside the area 20.

The geographic boundary 10 and geographic area 20 are defined by a center position G 12 and a radius R 14. The position data includes position coordinates (P_x, P_y) defining point P 200 and also includes an area of uncertainty 210 (e.g., providing a 95% level of certainty) defined by major axis 220 and a minor axis 230. The generalized uncertainty area may be defined by a circle 240 having a center point P 200 and a radius equal to or greater than the length of the major axis 220. Alternatively, the generalized uncertainty area may be defined by a square 245 having a center point P 200 and sides equal to or greater than twice the length of the major axis 220.

The test compares a maximum of P_x and P_y to a sum of the radius R 14 and half of the length of a side (radius 220) of the generalized square 245. The test may be written if max(P_x, P_y)>R+a, then the area of uncertainty 210 is outside of the geographical boundary 10. The comparison between the maximum value of P_x and P_y to a sum of the radius R and the major axis 220 may be performed by a hardware or software comparator, a processor or like means. If max(P_x, P_y)<=R+a, the result is not decisive and further testing is performed to determine whether the area of uncertainty 210 may be outside, inside or straddling the geographical boundary 10.

Figure 14:
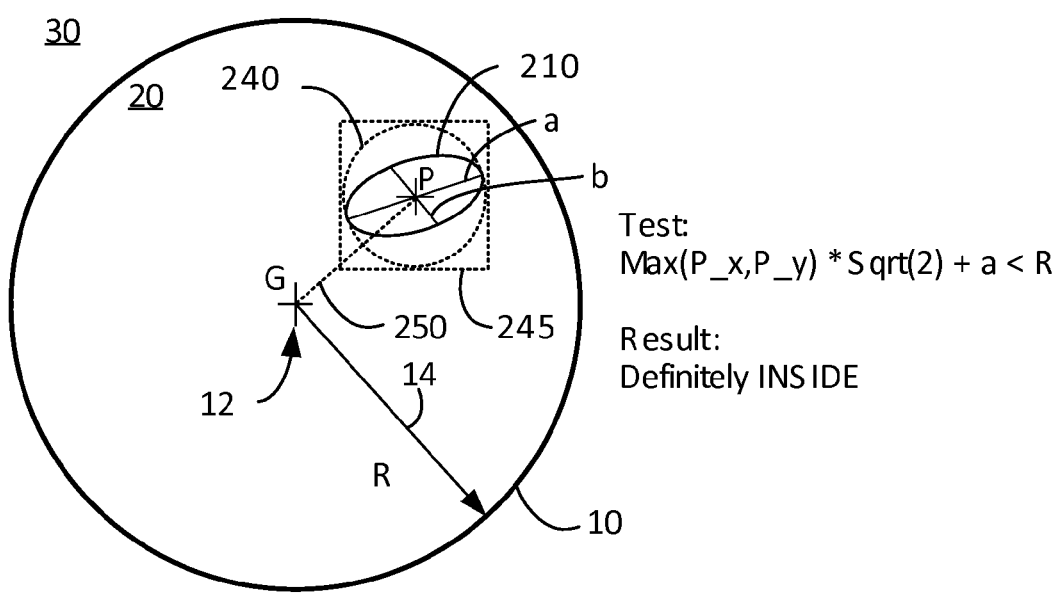

FIG. 14 shows a first order test used to determine whether an area of uncertainty is inside a geographic area 20. This test determines whether an over-inclusive generalized form of the area of uncertainty 210 is completely inside the area 20 enclosed by the geographical boundary 10. If the generalized area is inside the area 20, then the area of uncertainty 210 is also inside the area 20.

The test compares a sum of the maximum of P_x and P_y multiplied by the square root of 2 and the radius 220 of the generalized circle 240. The test may be written if max(P_x, P_y)*sqrt(2)+a<R, then the area of uncertainty 210 is inside of the geographical boundary 10. The parameter "sqrt(2)" may be approximated by an adjustment parameter approximately equal 1.4 or 1.5. The comparison between the sum of the maximum value (of P_x and P_y) and the major axis (a) to the radius R may be performed by a hardware or software comparator, a processor or like means.

Figure 15:
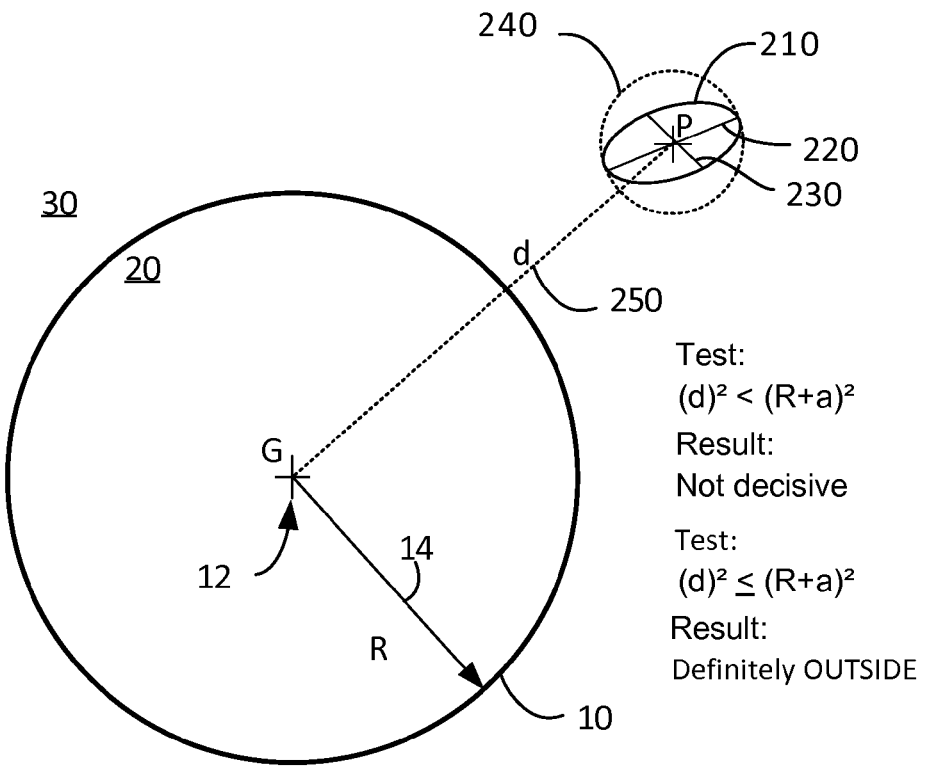

FIG. 15 shows a second order test used to determine whether an area of uncertainty is outside a geographic area 20. A second order test operates with multiplication operations to obtain a result. This test determines whether an over-inclusive generalized form of the area of uncertainty 210 is completely outside the area 20 enclosed by the geographical boundary 10. If the generalized area is outside the area 20, then the area of uncertainty 210 is also outside the area 20.

The test compares a square of the distance between center points with a square of a sum of radii. Specifically, the test may be written if $(d)^2 <= (R+a)^2$, then the area of uncertainty 210 is outside of the geographical boundary 10, where the variable d is a distance from point G 12 to point P 200. The comparison between the square of a distance to the square of the sum of the radius R and the major axis 220 may be performed by a hardware or software comparator, a processor or like means. If $(d)^2<(R+a)^2$, the result is not decisive and further testing is performed to determine whether the area of uncertainty 210 may be outside, inside or straddling the geographical boundary 10.

Figure 16:
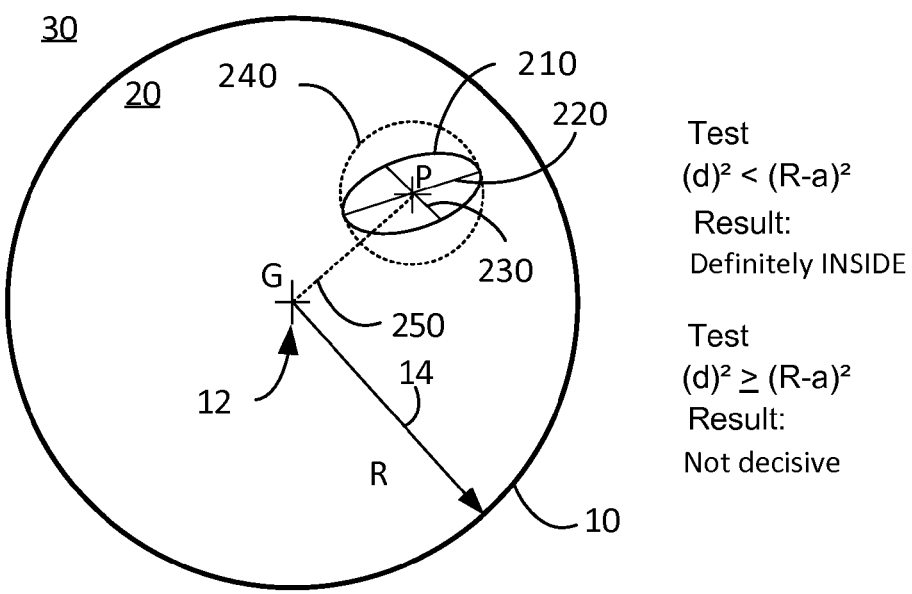

FIG. 16 shows a second order test used to determine whether an area of uncertainty is inside a geographic area 20. A second order test operates with multiplication operations to obtain a result. This test determines whether an over-inclusive generalized form of the area of uncertainty 210 is completely inside the area 20 enclosed by the geographical boundary 10. If the generalized area is inside the area 20, then the area of uncertainty 210 is also inside the area 20.

The test compares a square of the distance between center points with a square of a difference of radii. Specifically, the test may be written if $(d)^2<(R-a)^2$, then the area of uncertainty 210 is inside of the geographical boundary 10. The comparison between the square of the distance to the square of the difference of the radius R and the major axis 220 may be performed by a hardware or software comparator, a processor or like means. If $(d)^2>=(R-a)^2$, the result is not decisive and further testing is performed to determine whether the area of uncertainty 210 may be outside, inside or straddling the geographical boundary 10.

Figure 17:
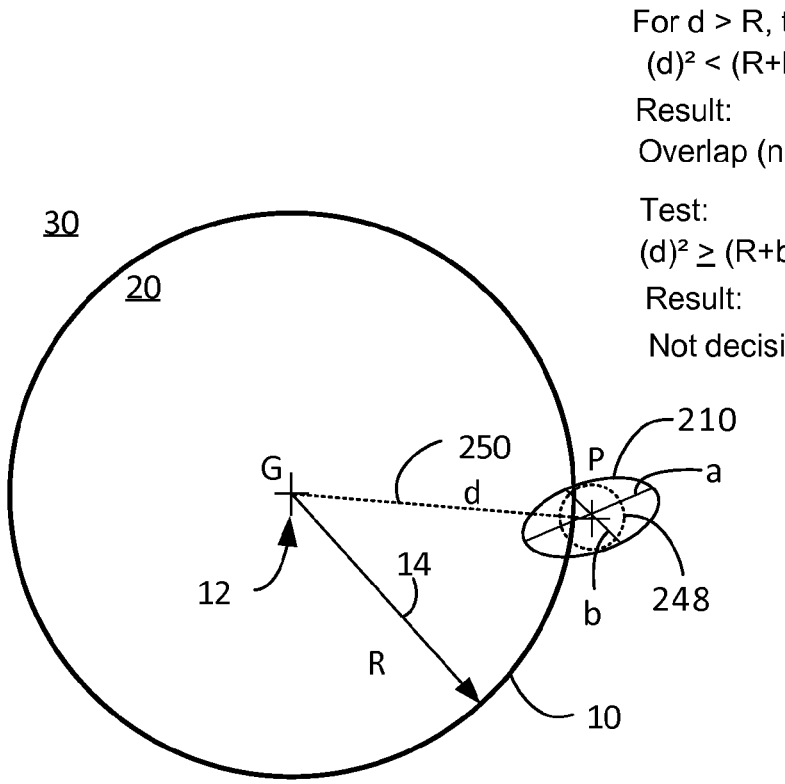

FIG. 17 shows a second order test used to determine whether a core 248 of an area of uncertainty 210 overlaps with a geographic area 20. This test is used when determining whether an exit event has occurred. This test determines whether an under-inclusive generalized form 248 of the area of uncertainty 210 partially overlaps the area 20 enclosed by the geographical boundary 10. If the generalized core area 248 is inside the area 20, then the area of uncertainty 210 straddles the outside the area 20.

The test compares a square of the distance between center points with a square of a sum of radii. Specifically, the test may be written if $(d)^2<(R+b)^2$, then the area of uncertainty 210 overlaps the geographical boundary 10. If $(d)^2>=(R+b)^2$, the result is not decisive and further testing is performed to determine whether the area of uncertainty 210 may be outside, inside or straddling the geographical boundary 10.

Figure 18:
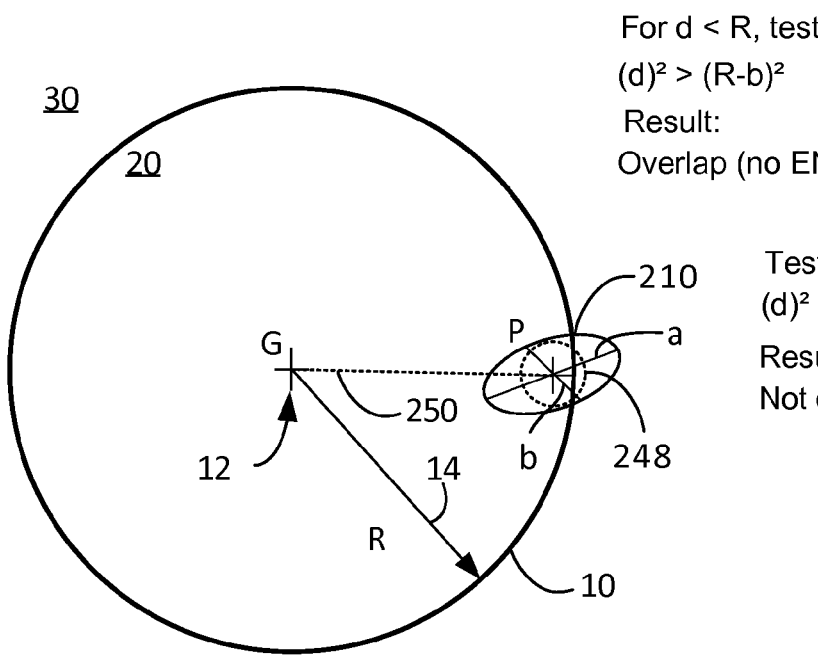

FIG. 18 shows a second order test used to determine whether a core 248 of an area of uncertainty 210 overlaps with a geographic area 20. This test is used when determining whether an entry event has occurred. This test determines whether an under-inclusive generalized form 248 of the area of uncertainty 210 partially overlaps the area 20 enclosed by the geographical boundary 10. If the generalized core area 248 is inside the area 20, then the area of uncertainty 210 straddles the outside the area 20.

The test compares a square of the distance between center points with a square of a difference of radii. Specifically, the test may be written if $(d)^2>(R-b)^2$, then the area of uncertainty 210 overlaps the geographical boundary 10. If $(d)^2<=(R-b)^2$, the result is not decisive and further testing is performed to determine whether the area of uncertainty 210 may be outside, inside or straddling the geographical boundary 10.

When the distance d is outside the ranges [R−a, R−b] and [R+b, R+a], the test described above with reference to FIGS. 13-18 may be used to definitively determine whether the uncertainty is outside, inside or overlapping with the geographic boarder 10. The tests described above and performed to this point have been non-iterative tests requiring significantly less CPU processing power and time than traditional iterative-numerical tests. If these non-iterative tests are decisive, the computational and time costs of numerical tests may be avoided. If these non-iterative tests are indecisive (for example, because the area of uncertainty is close but not known to overlap with the area 20), then numerical tests may be used to determine whether an area of uncertainty 210 overlaps with a geographical area 20.

Figure 19:
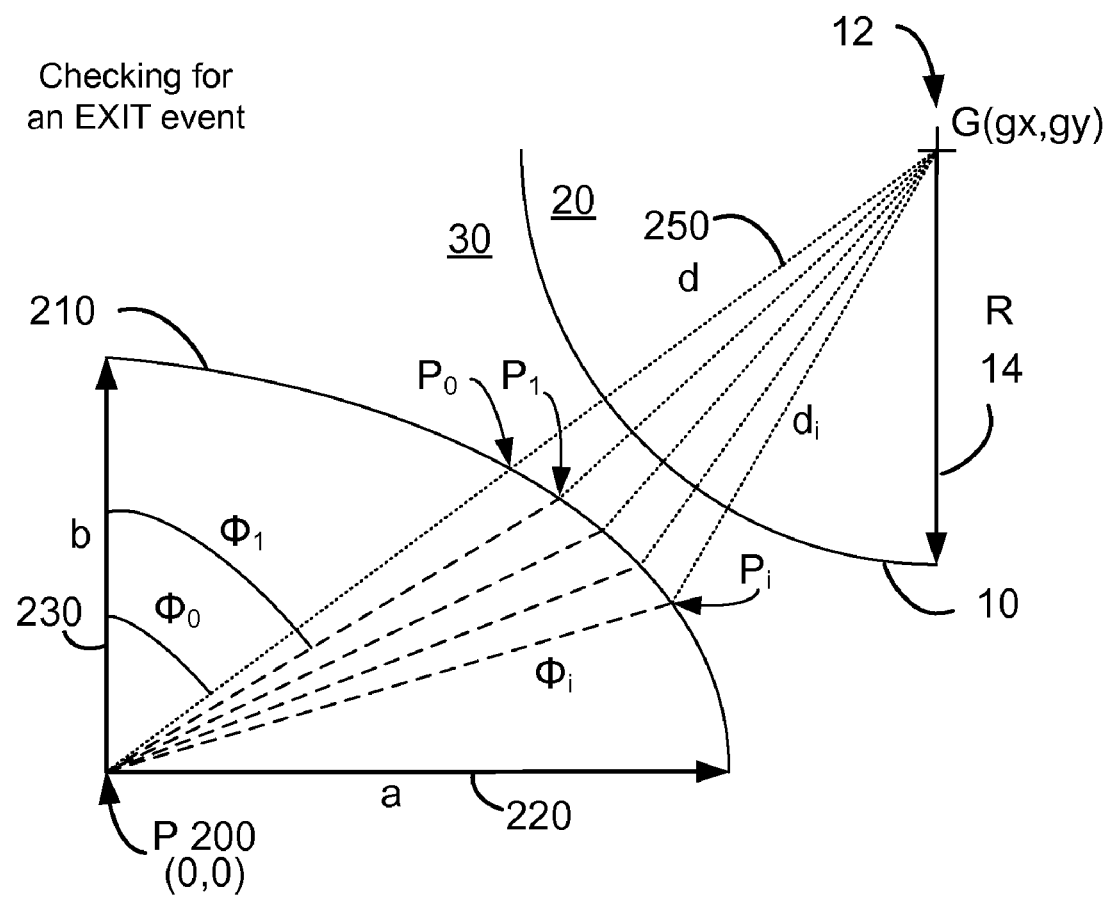

FIG. 19 shows an iterative-numerical test used to check for an exit event. The test may be used when the distance d between center points G and P is in a gray area where the under-inclusive core 248 does not cross the geographical boundary 10 but the over-inclusive generalized uncertainty area 240 does cross the geographical boundary 10. That is, when R+b<d<R+a, an iterative test may be used to check for an exit event.

The iterative test determines a first angle $\Phi_0 = a\tan(gy/gx)$ where $\Phi_0$ measures the angle from point P 200 of the ellipse, which is reoriented along its axis and centered at (0,0), to point G at a relative position (gx, gy) with axes a 220 aligned along the X axis. Not only is the ellipse reoriented but the circle may be rotated accordingly and transposed to first quadrant. An incremental angle $\Phi_i$ is defined as $\Phi_i = \Phi_0 + i*\Phi_A$, where i goes from 0 to n (e.g., 5, 10 or 15) and where $\Phi_A$ is an incremental step preset at a step angle (e.g., 1, 2 or 3 degrees). It will be apparent that a designer will need to balance conflicting interest of high resolution (driving $\Phi_A$ small), a low computation count (driving n small), and a wide span of angles tested (driving the product $n*\Phi_A$ large). A point $P_i$ is defined as a point on the uncertainty ellipse 210 that intersects with a line drawn from point P 200 at (0,0) at an angle $\Phi_i$. A distance $d_i$ is defined as a distance from point $P_i$ to point G 12 at (gx, gy), where distance $d_0$ is defined as a distance from point $P_0$ to point G 12 at (gx, gy).

The system iteratively computes, for i=0 to n, $\Phi_i$, $P_i$ and $d_i$, then compares $d_i$ to the radius R 14 of the area 20. If $d_i<R$, then the geographical boundary 10 intersects (straddles) the uncertainty ellipse 210 and the system may declare an overlap between area 20 and ellipse 210. If $d_i>d_{i-1}$, then $d_{i-1}$ was a minimum, therefore no intersection exist and the system may declare the uncertainty ellipse 210 is definitely outside of the area 20, therefore, it may report an exit event. Otherwise, the index i is incremented (i++) and the test is repeated unless i>n.

Figure 20:
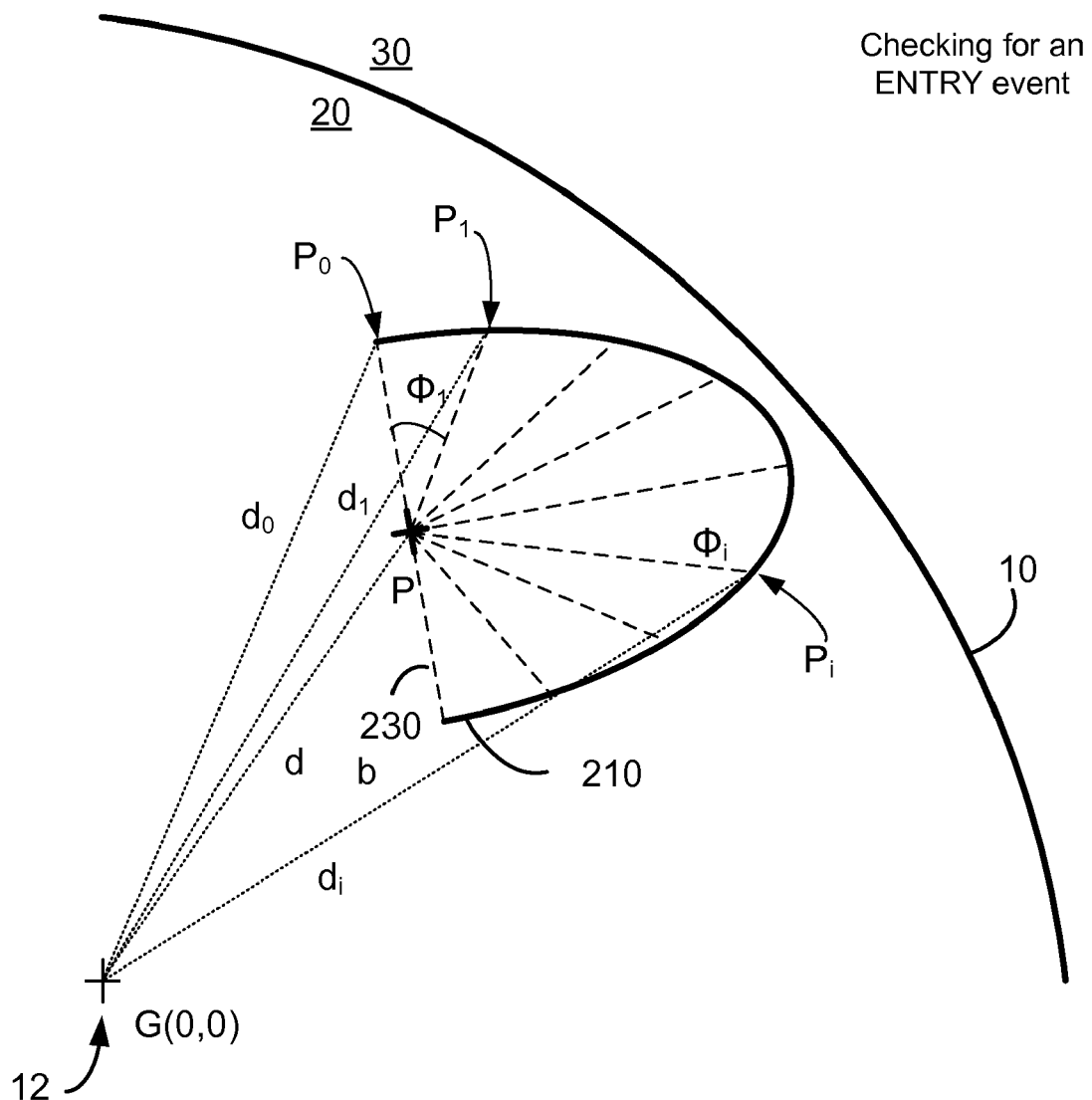

FIG. 20 shows an iterative-numerical test used to check for an entry event. The test may be used when the distance d between center points G and P is in a gray area where the under-inclusive core 248 does not cross the geographical boundary 10 but the over-inclusive generalized uncertainty area 240 does cross the geographical boundary 10. That is, when R−a<d<R−b, an iterative test to check for an entry may be performed.

The iterative test initializes by determining a first angle $\Phi_0$, which may be from the center P 200 (P_x, P_y) of the ellipse 210 and along a minor axis 230 of the ellipse 210. An incremental angle $\Phi_i$ offset from $\Phi_0$ is defined as $\Phi_i = \Phi_0 + i*\Phi_A$, where i goes from 0 to m (e.g., 5, 10 or 15) and where $\Phi_A$ is an incremental step preset at a step angle (e.g., 5 degrees). Again, it will be apparent that a designer will need to balance conflicting interest of high resolution (driving $\Phi_A$ small), a low computation count (driving m small), and a wide span of angles tested (driving the product $m*\Phi_A$ large). The parameter $\Phi_A$ described with reference to FIG. 19 may be different from this parameter $\Phi_A$ described with reference to FIG. 20. A point $P_i$ is defined as a point on the uncertainty ellipse 210 that intersects with a line drawn from point P 200 at an angle $\Phi_i$. A distance $d_i$ is defined as a distance from point $P_i$ to point G 12 at (gx, gy), where distance $d_0$ is defined as a distance from point $P_0$ to point G 12 at (gx, gy).

The system iteratively computes, for i=0 to m, $\Phi_i$, $P_i$ and $d_i$, then compares $d_i$ to the radius R 14 of the area 20. If $d_i>R$, then the geographical boundary 10 intersects (straddles) the uncertainty ellipse 210 and the system may declare an overlap between area 20 and ellipse 210. If $d_i<d_{i-1}$, then $d_{i-1}$ was a maximum, therefore no intersection exist and the system may declare no overlap. In this case, the uncertainty area 210 is entirely within the area 20, therefore an entry event may be reported. Otherwise, the index i is incremented (i++) and the test is repeated unless i>m.

Figure 21:
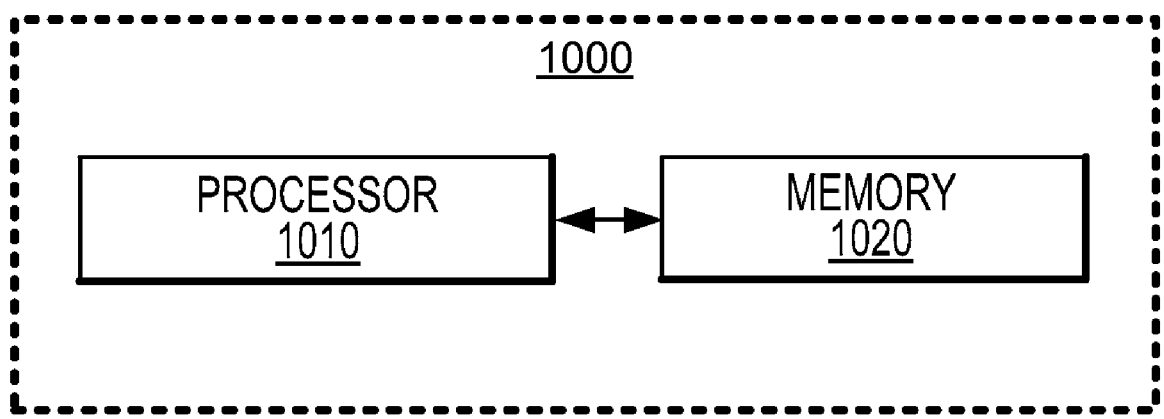
FIG. 21 shows a hardware implementation, in accordance with some embodiments of the present invention.

FIG. 21 shows a hardware implementation, in accordance with some embodiments of the present invention. The hardware 1000 includes a processor 1010 and associated memory 1020. The hardware 1000 may also include an internal satellite receiver or an interface to receive information from a satellite receiver. The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The memory 1020 includes software instructions for processing geographical coordinates into planar projection coordinates that represent a geographical boundary, software instructions for processing the position fix coordinates into planar projection coordinates to represent a position fix within a position fix area, and software instructions for monitoring whether the position fix has enter the geographical boundary. The processor 1010 is configured to access and execute the software instructions held by the memory 1020. In some embodiments, the memory 1020 is a component within the processor 1010. In some embodiments, the geographical tracking device 1000 is outside one or more geographical boundaries. Each geographical boundary is represented by a set of geographical coordinates. The processor 1010 is configured to access and execute software instructions from memory 1020 for each of the one or more geographical boundaries.

In some embodiments, the memory 1020 includes one or more additional software instructions such as, but not limited to, determining if the position fix is certainly outside the geographical boundary, determining if the position fix is certainly inside the geographical boundary, determining if the position fix is outside the geographical boundary, determining if the position fix is not inside the geographical boundary, obtaining a second position fix and determining if the second position fix is certainly outside the geographical boundary, determining if the second position fix is certainly inside the geographical boundary, determining if the second position fix is outside the geographical boundary, determining if the second position fix is not inside the geographical boundary, or performing an enter check on the position fix. In some embodiments, the enter check includes placing a geographical center at the origin of a x-y axis system, transposing the position fix to the first quadrant of the x-y axis system, setting a scan range for a polar angle of the position fix area based on an inclination angle α between a major axis and the North direction, scanning the polar angle over the scan range to compute a relative distance from the position fix area to the geographical center, and finding the maximum of the relative distance to determine if there is an enter event.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for tracking an asset, the method comprising:
obtaining a geographical boundary; receiving fix data comprising uncertainty parameters defining an area of uncertainty;
determining an over-inclusive area of uncertainty based on at least one of the uncertainty parameters; and
determining a relationship between the geographical boundary and the area of uncertainty based on the over-inclusive area of uncertainty, wherein the relationship comprises one of possible relationships comprising
a relationship in which the area of uncertainty is completely inside the geographical boundary;
a relationship in which the area of uncertainty is completely outside the geographical boundary; and
an indeterminate relationship; and reporting an event based on a change from a previous determined relationship, wherein the geographical boundary defines a radius R, wherein the area of uncertainty defines a major axis (a), and wherein the act of determining the relationship comprises:
comparing a maximum value to a sum of the radius R and the major axis (a); wherein the maximum value comprises max(P_x, P_y), where P_x is a relative latitudinal displacement and P_y is a relative longitudinal displacement between a center (G) of the geographical boundary and a center (P) of the area of uncertainty.

2. A method for tracking an asset, the method comprising:
obtaining a geographical boundary; receiving fix data comprising uncertainty parameters defining an area of uncertainty;
determining an over-inclusive area of uncertainty based on at least one of the uncertainty parameters; and
determining a relationship between the geographical boundary and the area of uncertainty based on the over-inclusive area of uncertainty, wherein the relationship comprises one of possible relationships comprising
a relationship in which the area of uncertainty is completely inside the geographical boundary;
a relationship in which the area of uncertainty is completely outside the geographical boundary; and
an indeterminate relationship; and
reporting an event based on a change from a previous determined relationship, wherein the geographical boundary defines a radius R, wherein the area of uncertainty defines a major axis (a), and wherein the act of determining the relationship comprises:
comparing a sum of a maximum value and the major axis (a) to the radius R; wherein the maximum value comprises of max(P_x, P_y) scaled by an adjustment parameter, where P_x is a relative latitudinal displacement and P_y is a relative longitudinal displacement between a center (G) of the geographical boundary and a center (P) of the area of uncertainty.

3. A method for tracking an asset, the method comprising:
obtaining a geographical boundary; receiving fix data comprising uncertainty parameters defining an area of uncertainty;
determining an over-inclusive area of uncertainty based on at least one of the uncertainty parameters; and determining a relationship between the geographical boundary and the area of uncertainty based on the over-inclusive area of uncertainty, wherein the relationship comprises one of possible relationships comprising
a relationship in which the area of uncertainty is completely inside the geographical boundary;
a relationship in which the area of uncertainty is completely outside the geographical boundary; and
an indeterminate relationship; and
reporting an event based on a change from a previous determined relationship, wherein the geographical boundary defines a radius R, wherein the area of uncertainty defines a major axis (a), and wherein the act of determining the relationship comprises:
comparing a square of a distance to a square of a sum of the radius R and the major axis (a); wherein the distance comprises a line between a center (G) of the geographical boundary and a center (P) of the area of uncertainty.

4. A method for tracking an asset, the method comprising:
obtaining a geographical boundary; receiving fix data comprising uncertainty parameters defining an area of uncertainty;
determining an over-inclusive area of uncertainty based on at least one of the uncertainty parameters; and
determining a relationship between the geographical boundary and the area of uncertainty based on the over-inclusive area of uncertainty, wherein the relationship comprises one of possible relationships comprising
a relationship in which the area of uncertainty is completely inside the geographical boundary;
a relationship in which the area of uncertainty is completely outside the geographical boundary; and
an indeterminate relationship; and reporting an event based on a change from a previous determined relationship, wherein the geographical boundary defines a radius R, wherein the area of uncertainty defines a major axis (a), and wherein the act of determining the relationship comprises:
comparing a square of a distance to a square of a difference of the radius R and the major axis (a); wherein the distance comprises a line between a center (G) of the geographical boundary and a center (P) of the area of uncertainty.

5. A method for tracking an asset, the method comprising:
obtaining a geographical boundary;
receiving fix data comprising uncertainty parameters defining an area of uncertainty;
determining an over-inclusive area of uncertainty based on at least one of the uncertainty parameters; and
determining a relationship between the geographical boundary and the area of uncertainty based on the over-inclusive area of uncertainty, wherein the relationship comprises one of possible relationships comprising
a relationship in which the area of uncertainty is completely inside the geographical boundary;
a relationship in which the area of uncertainty is completely outside the geographical boundary; and
an indeterminate relationship; and
reporting an event based on a change from a previous determined relationship, further comprising: determining a new fix is required based on an accuracy of the fix data and the indeterminate relationship exists between the geographical boundary and the area of uncertainty; receiving new fix data comprising new uncertainty parameters defining a new area of uncertainty; determining a new over-inclusive area of uncertainty based on at least one of the new uncertainty parameters; and determining a new relationship between the geographical boundary and the new area of uncertainty based on the new over-inclusive area of uncertainty wherein the geographical boundary defines a radius R, wherein the new area of uncertainty defines a major axis (a) and a minor axis (b), and wherein the act of determining the new relationship comprises:
comparing a square of a distance to a square of a sum of the radius R and the minor axis (b); wherein the distance is between a center (G) of the geographical boundary and a center (P) of the area of uncertainty.

6. A method for tracking an asset, the method comprising:
obtaining a geographical boundary;
receiving fix data comprising uncertainty parameters defining an area of uncertainty;
determining an over-inclusive area of uncertainty based on at least one of the uncertainty parameters; and
determining a relationship between the geographical boundary and the area of uncertainty based on the over-inclusive area of uncertainty, wherein the relationship comprises one of possible relationships comprising
a relationship in which the area of uncertainty is completely inside the geographical boundary;
a relationship in which the area of uncertainty is completely outside the geographical boundary; and
an indeterminate relationship; and
reporting an event based on a change from a previous determined relationship, further comprising: determining a new fix is required based on an accuracy of the fix data and the indeterminate relationship exists between the geographical boundary and the area of uncertainty; receiving new fix data comprising new uncertainty parameters defining a new area of uncertainty; determining a new over-inclusive area of uncertainty based on at least one of the new uncertainty parameters; and determining a new relationship between the geographical boundary and the new area of uncertainty based on the new over-inclusive area of uncertainty further comprising performing a numerical test to check for an intersection between the new area of uncertainty and the geographical boundary, wherein the act of performing the numerical test comprises:
determining a sequence of points along an edge of the new area of uncertainty; and
for each point (Pi) of the sequence of points, determining a distance (di) between the point (Pi) and a center of the geographical boundary; comparing the distance (di) to the radius R of the geographical boundary; and determining whether the geographical boundary overlaps with the new area of uncertainty.

7. The method of claim 6, wherein the act of performing the numerical test further comprises:
centering and rotating the new area of uncertainty prior to the act of determining the sequence of points.

8. The method of claim 6, wherein the act of performing the numerical test further comprises:
finding a minimum distance ($d_{i-1}$); and
determining no overlap exists.

9. A method for tracking an asset, the method comprising:
obtaining a geographical boundary; receiving fix data comprising uncertainty parameters defining an area of uncertainty;
determining an over-inclusive area of uncertainty based on at least one of the uncertainty parameters; and determining a relationship between the geographical boundary and the area of uncertainty based on the over-inclusive area of uncertainty, wherein the relationship comprises one of possible relationships comprising
a relationship in which the area of uncertainty is completely inside the geographical boundary;
a relationship in which the area of uncertainty is completely outside the geographical boundary; and
an indeterminate relationship; and
reporting an event based on a change from a previous determined relationship, further comprising: determining a new fix is required based on an accuracy of the fix data and the indeterminate relationship exists between the geographical boundary and the area of uncertainty; receiving new fix data comprising new uncertainty parameters defining a new area of uncertainty; determining a new over-inclusive area of uncertainty based on at least one of the new uncertainty parameters; and determining a new relationship between the geographical boundary and the new area of uncertainty based on the new over-inclusive area of uncertainty wherein the geographical boundary defines a radius R, wherein the new area of uncertainty defines a major axis (a) and a minor axis (b), and wherein the act of determining the new relationship comprises:
comparing a square of a distance to a square of a difference between the radius R and the minor axis (b);
wherein the distance comprises between a center (G) of the geographical boundary and a center (P) of the area of uncertainty.

10. The method of claim 6, wherein the act of performing the numerical test further comprises:
finding a maximum distance ($d_{i-1}$); and
determining no overlap exists.

11. A system for tracking an asset, the system comprising:
means for obtaining a geographical boundary;
means for receiving fix data comprising uncertainty parameters defining an area of uncertainty wherein the area of uncertainty may be a circle, square, or ellipse;
means for determining an over-inclusive area of uncertainty based on at least one of the uncertainty parameters; and means for determining a relationship between the geographical boundary and the area of uncertainty based on the over-inclusive area of uncertainty, wherein the relationship comprises one of possible relationships comprising
a relationship in which the area of uncertainty is completely inside the geographical boundary;
a relationship in which the area of uncertainty is completely outside the geographical boundary; and
an indeterminate relationship; and means for reporting an event based on a change from a previous determined relationship, and further wherein the geographical boundary defines a radius R, wherein the area of uncertainty defines a major axis (a), and wherein the means for determining the relationship comprises:
means for comparing a sum of a maximum value and the major axis (a) to the radius R;
wherein the maximum value comprises of max(P_x, P_y) scaled by an adjustment parameter, where P_x is a relative latitudinal displacement and P_y is a relative longitudinal displacement between a center (G) of the geographical boundary and a center (P) of the area of uncertainty.

12. A system for tracking an asset, the system comprising:
means for obtaining a geographical boundary;
means for receiving fix data comprising uncertainty parameters defining an area of uncertainty wherein the area of uncertainty may be a circle, square, or ellipse;
means for determining an over-inclusive area of uncertainty based on at least one of the uncertainty parameters; and
means for determining a relationship between the geographical boundary and the area of uncertainty based on the over-inclusive area of uncertainty, wherein the relationship comprises one of possible relationships comprising
a relationship in which the area of uncertainty is completely inside the geographical boundary;
a relationship in which the area of uncertainty is completely outside the geographical boundary; and
an indeterminate relationship; and means for reporting an event based on a change from a previous determined relationship, and further wherein the geographical boundary defines a radius R, wherein the area of uncertainty defines a major axis (a), and wherein the means for determining the relationship comprises:
means for comparing a square of a distance to a square of a sum of the radius R and the major axis (a); wherein the distance comprises between a center (G) of the geographical boundary and a center (P) of the area of uncertainty.

13. A system for tracking an asset, the system comprising:
means for obtaining a geographical boundary;
means for receiving fix data comprising uncertainty parameters defining an area of uncertainty wherein the area of uncertainty may be a circle, square, or ellipse;
means for determining an over-inclusive area of uncertainty based on at least one of the uncertainty parameters; and
means for determining a relationship between the geographical boundary and the area of uncertainty based on the over-inclusive area of uncertainty, wherein the relationship comprises one of possible relationships comprising
a relationship in which the area of uncertainty is completely inside the geographical boundary;
a relationship in which the area of uncertainty is completely outside the geographical boundary; and
an indeterminate relationship; and means for reporting an event based on a change from a previous determined relationship, and further wherein the geographical boundary defines a radius R, wherein the area of uncertainty defines a major axis (a), and wherein the means for determining the relationship comprises:
means for comparing a square of a distance to a square of a difference of the radius R and
the major axis (a);
wherein the distance comprises between a center (G) of the geographical boundary and a center (P) of the area of uncertainty.

14. A system for tracking an asset, the system comprising:
means for obtaining a geographical boundary;
means for receiving fix data comprising uncertainty parameters defining an area of uncertainty wherein the area of uncertainty may be a circle, square, or ellipse;

means for determining an over-inclusive area of uncertainty based on at least one of the uncertainty parameters; and means for determining a relationship between the geographical boundary and the area of uncertainty based on the over-inclusive area of uncertainty, wherein the relationship comprises one of possible relationships comprising a relationship in which the area of uncertainty is completely inside the geographical boundary;

a relationship in which the area of uncertainty is completely outside the geographical boundary; and an indeterminate relationship; and means for reporting an event based on a change from a previous determined relationship, and further wherein the geographical boundary defines a radius R, wherein the area of uncertainty defines a major axis (a), and wherein the means for determining the relationship comprises: means for comparing a square of a distance to a square of a difference of the radius R and the major axis (a); wherein the distance comprises between a center (G) of the geographical boundary and a center (P) of the area of uncertainty.

* * * * *